(12) United States Patent
Tomiyasu et al.

(10) Patent No.: US 7,463,388 B2
(45) Date of Patent: Dec. 9, 2008

(54) IMAGE FORMING APPARATUS WITH CONTROL OF IMAGE FORMATION USING READ INFORMATION

(75) Inventors: Hiroaki Tomiyasu, Ibaraki (JP); Jun'ichi Intoh, Tokyo (JP); Masatoshi Tanabe, Ibaraki (JP); Toshio Hayashi, Ibaraki (JP); Yoshihiro Funamizu, Chiba (JP); Keizo Isemura, Tokyo (JP); Mitsushige Murata, Chiba (JP); Yuichi Seki, Saitama (JP); Akihiko Sakai, Chiba (JP); Kuniyasu Kimura, Ibaraki (JP); Shigeru Kasahara, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 908 days.

(21) Appl. No.: 10/853,205

(22) Filed: May 26, 2004

(65) Prior Publication Data

US 2004/0257601 A1 Dec. 23, 2004

(30) Foreign Application Priority Data

May 29, 2003 (JP) ............................... 2003-152425
Jul. 18, 2003 (JP) ............................... 2003-199354

(51) Int. Cl.
*G06K 15/00* (2006.01)
*H04N 1/40* (2006.01)

(52) U.S. Cl. .................. 358/3.24; 358/406; 358/504; 347/106; 283/85; 455/6.1; 455/41.3

(58) Field of Classification Search .................. 358/1.9, 358/3.24, 406, 504; 283/85; 455/41.3, 66.1; 270/58.09; 399/410; 400/76; 220/589; 347/106; 235/492; 725/29; 340/686.2, 572.1
See application file for complete search history.

(56) References Cited

U.S. PATENT DOCUMENTS 4,878,656 A * 11/1989 Honjo et al. ............. 270/58.09

(Continued)

FOREIGN PATENT DOCUMENTS

JP 9-164593 6/1997

(Continued)

*Primary Examiner*—Twyler L Haskins
*Assistant Examiner*—Nicholas C Pachol
(74) *Attorney, Agent, or Firm*—Fitzpatrick, Cella, Harper & Scinto

(57) ABSTRACT

In an image forming apparatus which requires the user to manually input sheet medium information, (when a bundle of sheets which include a plurality of types of print media are to be printed, the user must manually input setups of the image forming apparatus for each individual print medium. In manual setups by the user, some setups require user's knowledge about print media. When the user has made wrong setups, a print result cannot be obtained under an appropriate control condition Furthermore, when information about a print medium is sensed by the sensor without manual setups, the information cannot be often precisely detect depending on the type and thickness of the print medium, an environment, and the like, and it is consequently difficult to attain optimal image formation. It is an object of this invention to attain optimal image formation, saving user labor and shortening the print time by using a radio tag attached to the sheet medium. An image forming apparatus which forms an image on a sheet medium, has means for reading information from a information holding means, such as a minuscule radio chip, attached to the sheet medium, and means for manually inputting information of the sheet medium, and controls an image forming condition using either information.

4 Claims, 28 Drawing Sheets

U.S. PATENT DOCUMENTS

| | | | |
|---|---|---|---|
| 5,032,876 A * | 7/1991 | Murakami | 399/410 |
| 5,168,290 A | 12/1992 | Tanaka et al. | 346/134 |
| 5,406,358 A | 4/1995 | Kimura et al. | 355/271 |
| 5,555,082 A | 9/1996 | Tanaka et al. | 355/309 |
| 5,599,009 A * | 2/1997 | Mandel et al. | 270/58.09 |
| 5,761,600 A | 6/1998 | Murata | 399/403 |
| 6,330,422 B1 | 12/2001 | Sato et al. | 399/382 |
| 6,603,951 B2 | 8/2003 | Sato et al. | 399/382 |
| 6,827,279 B2 * | 12/2004 | Teraura | 235/492 |
| 7,245,227 B2 * | 7/2007 | Winter et al. | 340/686.2 |
| 7,290,715 B2 * | 11/2007 | Sellen et al. | 235/492 |
| 2002/0191998 A1 * | 12/2002 | Cremon et al. | 400/76 |
| 2003/0016958 A1 | 1/2003 | Wada et al. | 399/45 |
| 2003/0029875 A1 * | 2/2003 | Sesek | 220/589 |
| 2004/0021266 A1 | 2/2004 | Mizuta et al. | 271/303 |
| 2004/0114023 A1 * | 6/2004 | Jacobsen et al. | 347/106 |
| 2005/0114882 A1 * | 5/2005 | Sakamaki et al. | 725/29 |

FOREIGN PATENT DOCUMENTS

JP     2002-120475     4/2002

\* cited by examiner

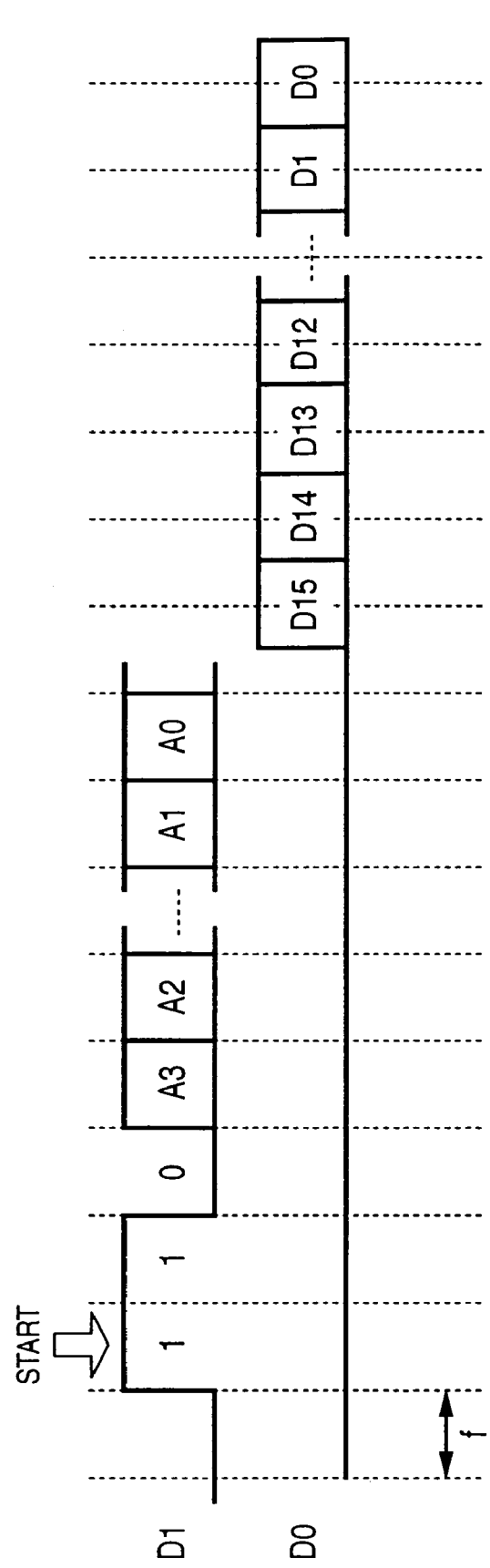

FIG. 9A

| COMMAND | | CONTROL CONTENTS |
|---|---|---|
| 1 | 0 | READ |

FIG. 9B

| ADDRESS | DATA (16 BITS) |
|---|---|
| 00h | TAG ID#0 |
| 01h | TAG ID#1 |
| 02h | TAG ID#3 |
| 03h | MANUFACTURER |
| 04h | DATE OF MANUFACTURE |
| 05h | PRINT MEDIUM TYPE |
| 06h | PRINT MEDIUM SIZE |
| ⋮ | |
| 0Fh | |

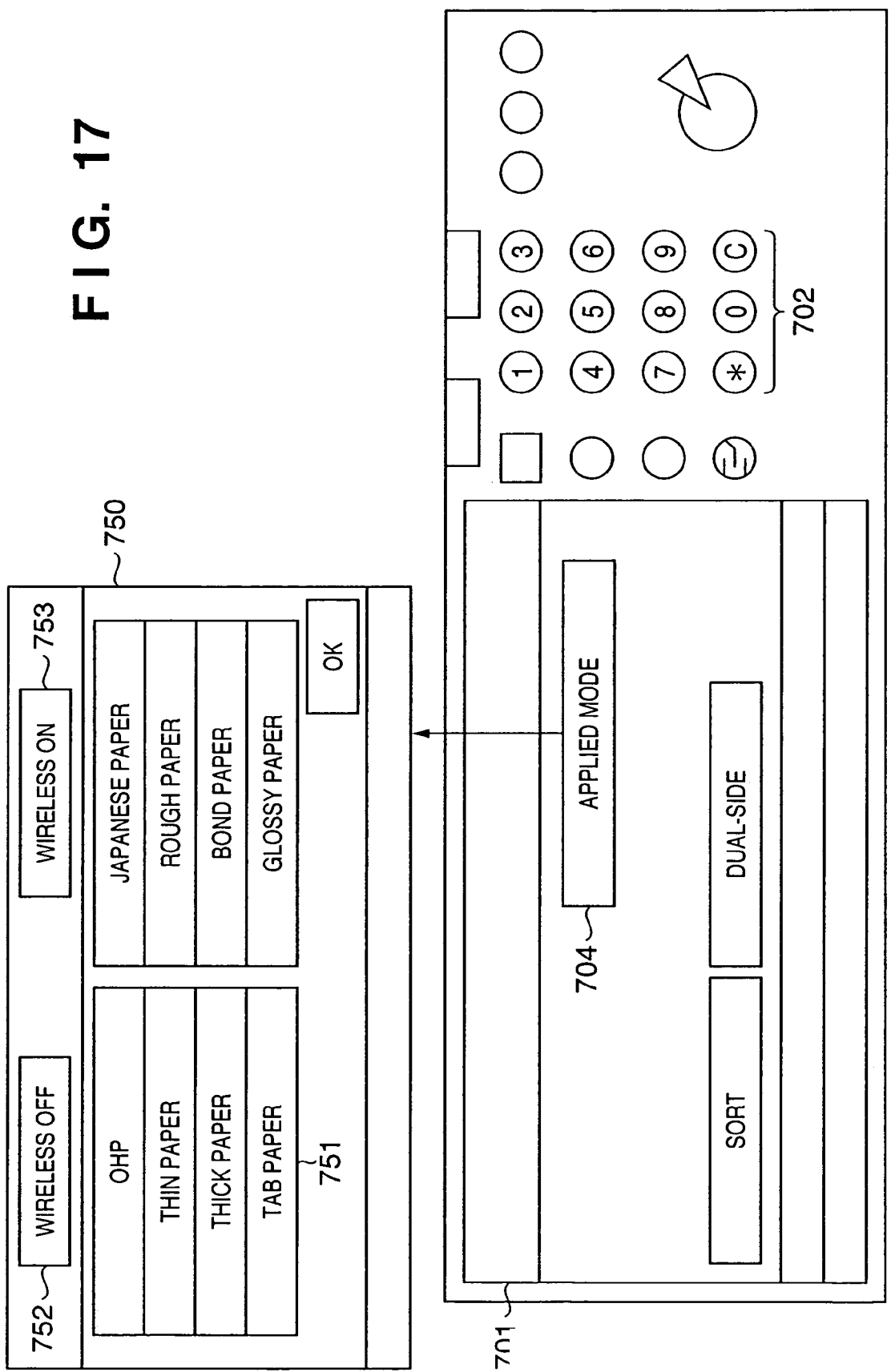

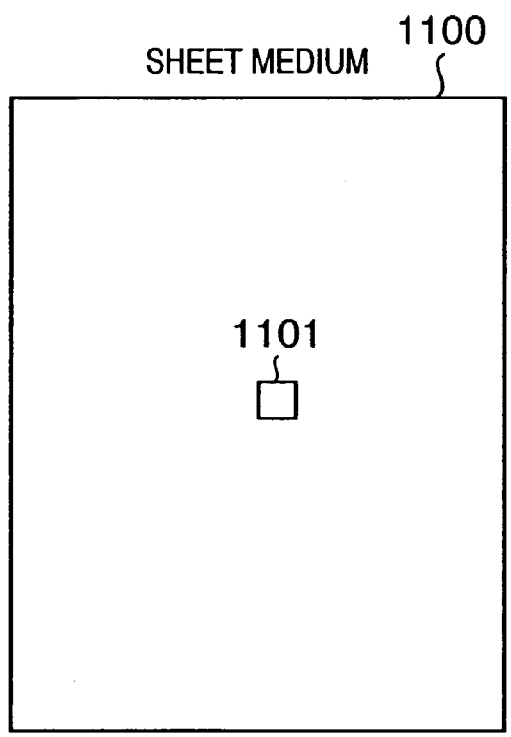
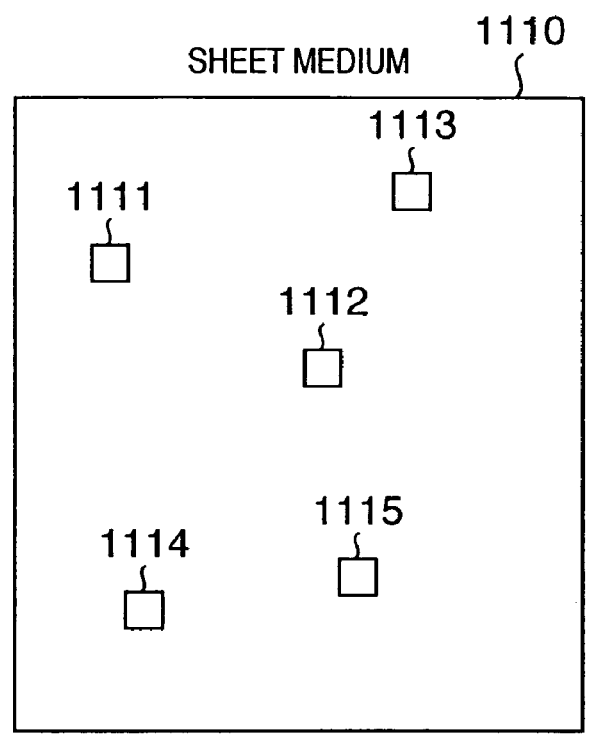
F I G. 18A        F I G. 18B

FIG. 20

| PAPER TYPE | ~1201 |
|---|---|
| OHP | |
| PLAIN PAPER 2 (90g/m² - 105g/m²) | |
| ROUGH PAPER (GRANULAR PAPER) | |
| COLOR PAPER | |
| BOND PAPER | |
| ⋮ | |
| PAPER SIZE (mm) | ~1202 |
| 420 × 297 | |
| 297 × 210 | |
| 210 × 148 | |
| 148 × 105 | |
| 105 × 74 | |
| ⋮ | |
| FIXING TEMPERATURE | ~1203 |
| 180 | |
| 200 | |
| 210 | |
| 220 | |
| 230 | |

FIG. 23

| PAPER SIZE | LENGTH mm | WIDTH mm | SCAN UPPER LIMIT |
|---|---|---|---|
| A3 PAPER | 420 | 297 | LEVEL 1 |
| A4 PAPER | 297 | 210 | LEVEL 2 |
| A5 PAPER | 210 | 148 | LEVEL 3 |
| A6 PAPER | 148 | 105 | LEVEL 4 |
| A7 PAPER | 105 | 74 | LEVEL 5 |

FIG. 26

| PAPER TYPE | FIXING TEMPERATURE LEVEL | PAPER CONVEY SPEED |
|---|---|---|
| OHP | LEVEL 1 | LEVEL 1 |
| PLAIN PAPER 2 (90g/m² – 105g/m²) | LEVEL 2 | LEVEL 2 |
| ROUGH PAPER (GRANULAR PAPER) | LEVEL 3 | LEVEL 3 |
| COLOR PAPER | LEVEL 4 | LEVEL 4 |
| BOND PAPER | LEVEL 5 | LEVEL 5 |
| LABEL PAPER | LEVEL 6 | LEVEL 6 |
| GLOSSY PAPER | LEVEL 7 | LEVEL 7 |

IMAGE FORMING APPARATUS WITH CONTROL OF IMAGE FORMATION USING READ INFORMATION

FIELD OF THE INVENTION

The present invention relates to an image forming apparatus and, more particularly, to an image forming apparatus which can set an optimal print condition to the properties of print media such as print paper sheets, and the like upon execution of a print process, and a control method thereof.

BACKGROUND OF THE INVENTION

Conventionally, sheet-like print media attached with RFID tags (Radio Frequency IDentifier tag: also called a radio identification tag, radio tag, or information holding medium) that can be exchanged via radio communications have been proposed, and their application examples are disclosed (for example, see Japanese Patent Laid-Open No. 2002-120475).

In an image forming apparatus, since there are many kinds of print media, and an image varies depending on the type of a print medium, a method of setting the image forming condition for each print process in correspondence with the type and thickness of a print medium, or detecting a print medium using a sensor for detecting the type and thickness of a print medium, setting an image processing condition according to the detection values, and forming an image is adopted. Also, a remaining quantity sensor can only recognize an approximate remaining quantity of print media in print medium storage means.

In an image forming apparatus, since an optimal fixing temperature and convey speed are set depending on the material and size of sheet media, the user must input and set information associated with these setups (see Japanese Patent Laid-Open No. 9-164593).

However, the sensor cannot often precisely detect information about a print medium depending on the type and thickness of the print medium, an environment, and the like, and it is consequently difficult to attain optimal image formation. Recently, it is demanded to form a still optimal image on a print medium.

When image formation is made on a wrong print medium in place of a desired print medium, it must be redone using that desired print medium, resulting in wasteful processes.

In manual setups by the user, some setups require user's knowledge about print media. When the user has made wrong setups, a print result cannot be obtained under an appropriate control condition. For example, when a sheet medium, which is set to have a standard thickness in the user setups but actually has a nonstandard thickness, is inserted and conveyed, it may cause troubles such as JAM or the like in a convey path.

Furthermore, when a continuous print process is executed for a bundle of sheets including different types of sheet media, independent user setups are conventionally required for image formation on respective sheet media. Hence, the productivity impairs considerably compared to image formation on uniform sheet media.

SUMMARY OF THE INVENTION

The present invention has been made in consideration of the above problems, and has as its first object to provide an image forming apparatus, which can form a high-quality image under the condition suited to a designated print medium by automatically setting an image forming condition suited to a print medium on the basis of medium information read out from information holding means attached to the print medium and a control method thereof, to provide an image forming apparatus which can minimize user's manual setups and can reduce the load on the user and a control method thereof, and to provide an image forming apparatus which can shorten the print time required for print media including a plurality of different types of media and can improve the productivity of the print process by obviating the need for manual setups of print medium information and a control method thereof.

When the remaining quantity of print media required upon image formation cannot be accurately detected, print media go out during image formation, and the print process is undesirably interrupted.

The present invention has been made in consideration of the above problems, and has as its second object to provide an image forming apparatus which can prevent a print process from being interrupted due to out of print media during image formation, since information associated with the quantity of print media can be displayed, and a deficiency of the remaining quantity of print media can be output, on the basis of information read out from information holding means appended to print media, and a control method thereof.

When thick print media undergo post-processes such as stapling, punching, two- or Z-folding, and the like, such post-processes cannot often be appropriately applied depending on the number of media.

The present invention has been made in consideration of the above problems, and has as its third object to provide an image forming apparatus which can make image formation that matches the condition for post-processes by outputting, when the thickness of each print medium exceeds a thickness that allows post-processes, a warning indicating it, and a control method thereof.

Furthermore, when image formation is made using print media with tabs and is interrupted for some reason (to be referred to as jam hereinafter), and the position of a tab attached to a print medium that has suffered a jam cannot be detected, the user must insert a print medium with a required tab position, resulting in troublesome operations.

The present invention has been made in consideration of the above problems, and has as its fourth object to provide an image forming apparatus which has tab position information of tab sheets when print media are tab sheets, and can adjust an order of tab sheets to insert a tab sheet of an appropriate tab position even when the order of tab sheets deviates due to a jam or the like during an image forming operation, and a control method thereof.

When the print media with the RFID tags are used in a conventional image forming apparatus, whether information of the RFID tag is to be used or cassette information is read out using an indicator provided to a paper cassette must be determined.

The present invention has been made in consideration of the above problem, and has as its fifth object to provide an image forming apparatus which preferentially reads out information of the RFID tag with a larger information volume, makes optimal image formation control, and displays a message that advises accordingly for the user, when information can be read out from both the RFID tag and cassette indicator.

According to a first aspect of the present invention, the foregoing objects are attained by providing an image forming apparatus for conveying a sheet medium, and forming an image on the sheet medium, comprising read means for reading information from an information holding medium, which can transmit/receive a signal, attached to the sheet medium; setting means for setting an image forming condition on the basis of the information read out by the read means; and control means for making image formation under an optimal image forming condition on the sheet medium on the basis of the image forming condition set by the setting means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 is a timing chart showing an RFID read operation according to the first embodiment;

FIGS. 9A and 9B show address maps of a memory of the RFID tag according to the first embodiment;

FIG. 17 is a view showing the configuration of a control panel of the image forming apparatus according to the second embodiment;

FIGS. 18A and 18B are views showing the arrangement of sheet media according to the second embodiment;

FIG. 20 shows a paper type list stored in the wireless chip according to the second embodiment;

FIG. 23 is a table showing the relationship between the scan output upper limits of the wireless unit and paper sizes according to the second embodiment;

FIG. 26 is a table showing the fixing temperatures and convey speeds corresponding to paper types according to the second embodiment;

DETAILED DESCRIPTION OF THE PREFERRED EMBODIMENTS

First Embodiment

A digital copying machine as an example of a preferred embodiment of the present invention will be described hereinafter. FIGS. 1 to 5 show the arrangement of an image forming apparatus according to an embodiment of the present invention. The basic arrangement will be explained below using FIGS. 1 to 5.

<Arrangement of Color Reader Unit>

Figure 2:
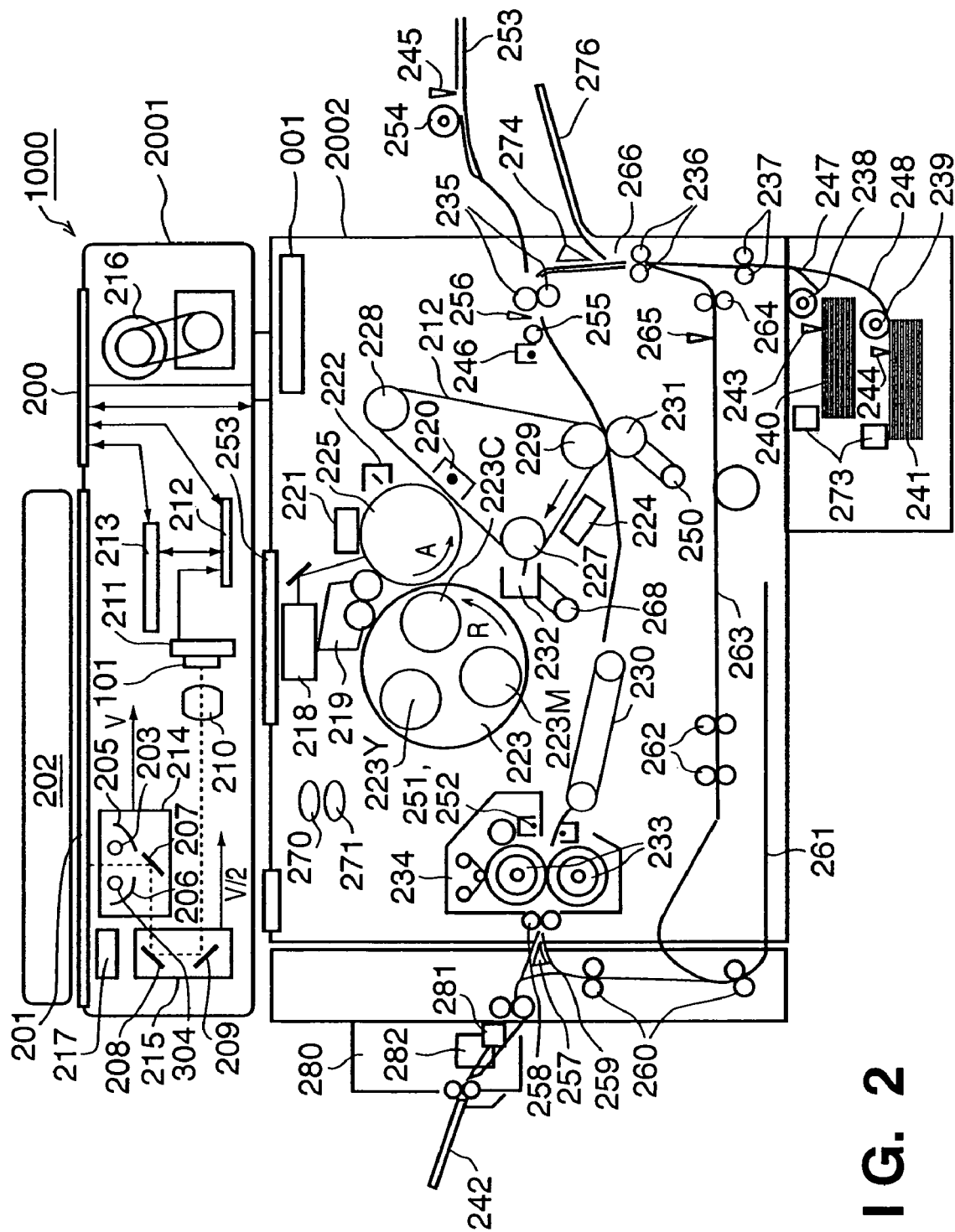
FIG. 2 is a sectional view showing the arrangement of an image forming apparatus according to the first embodiment.

FIG. 2 shows the overall arrangement of an image forming apparatus 1000, and an upper portion of FIG. 2 shows the arrangement of a color reader unit 2001. In FIG. 2, reference numeral 101 denotes a CCD; 211, a broad on which the CCD 101 is mounted; 200, a control board that controls the overall image forming apparatus; 212, a digital image processor which converts an image signal captured by the CCD into digital data, and applies predetermined image processes to the digital data; 201, a document table glass (platen); 202, a document feeder (DF) (note that an arrangement which comprises a mirror-surface pressing plate (not shown) in place of the document feeder 202 is also available); 203 and 204, light sources (halogen lamps or fluorescent lamps) which illuminate a document with light; 205 and 206, reflection umbrellas for focusing light beams coming from the light sources 203 and 204 onto a document; 207 to 209, mirrors; 210, a lens for focusing light reflected by or projected through a document onto the CCD 101; 214, a carriage that houses the halogen lamps 203 and 204, reflection umbrellas 205 and 206, and mirror 207; 215, a carriage that houses the mirrors 208 and 209; and 213, an external interface (I/F) with another device. Note that the carriages 214 and 215 respectively mechanically move at velocities V and V/2 in a direction perpendicular to an electrical scan (main scan) direction, thus scanning (sub-scanning) the entire surface of a document.

Figure 3:
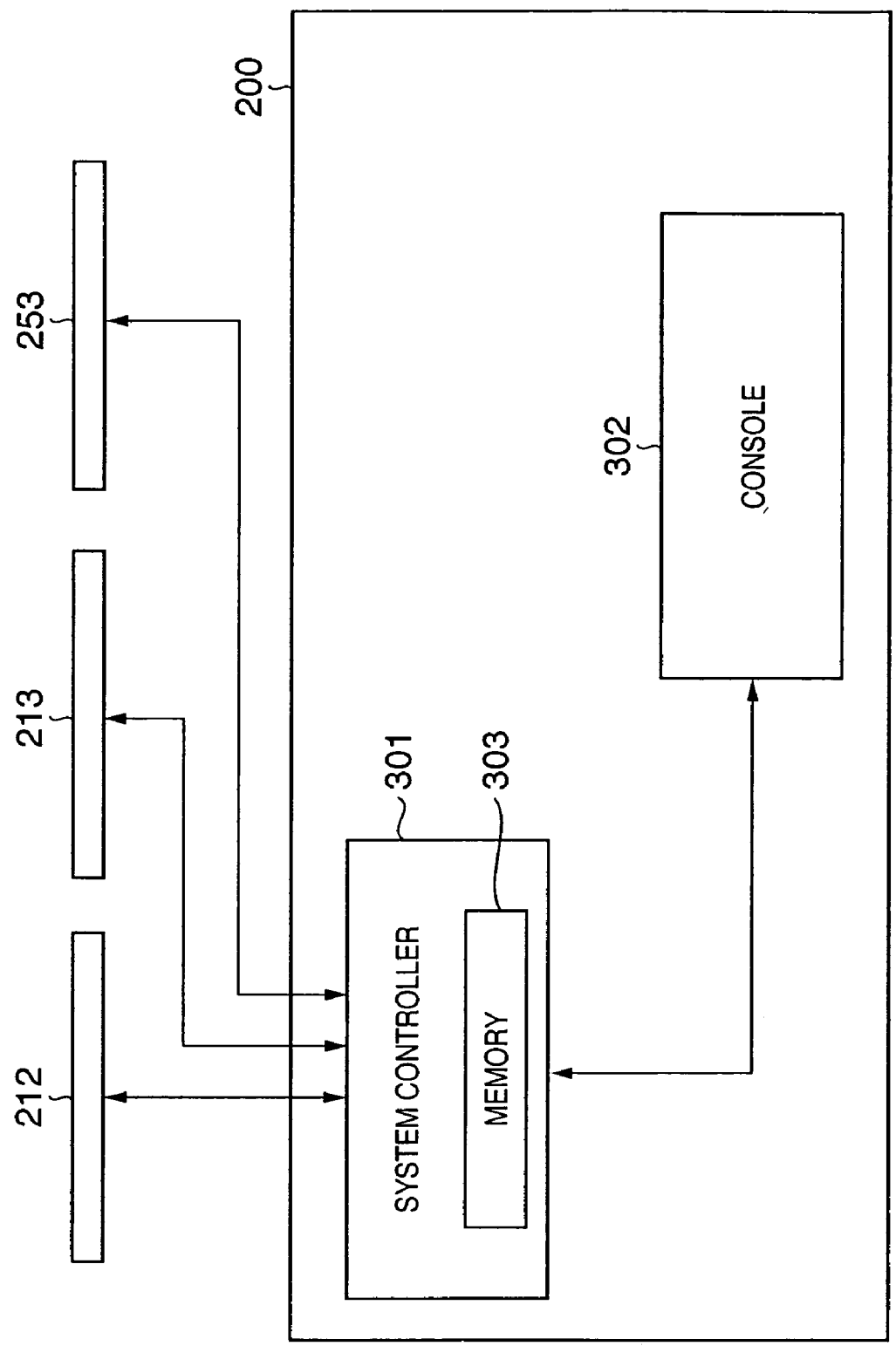
FIG. 3 is a control block diagram of the overall system of the image forming apparatus according to the first embodiment.

The control board 200 comprises a system controller 301 which has I/Fs used to exchange information for controlling the digital image processor 212, the external I/F 213, and a printer I/F 253, a memory 303 in the system controller 301, and a console 302, as shown in FIG. 3. The console 302 comprises a liquid crystal display with a touch panel, which is used to input process execution contents by an operator, and to notify information, warning, and the like associated with processes to the operator. The console 302 also displays a warning message, as will be described later. The console 302 is used to input an image forming mode. The image forming mode includes various image forming modes such as an Nin1 mode for forming a plurality of pages per sheet, dual/single-side modes, booklet print mode, and the like. The input image forming mode is stored in a predetermined storage area of a memory 0012 or the like. Also, the input image forming mode includes designation of post-processes such as stapling, folding, and the like.

Figure 4:
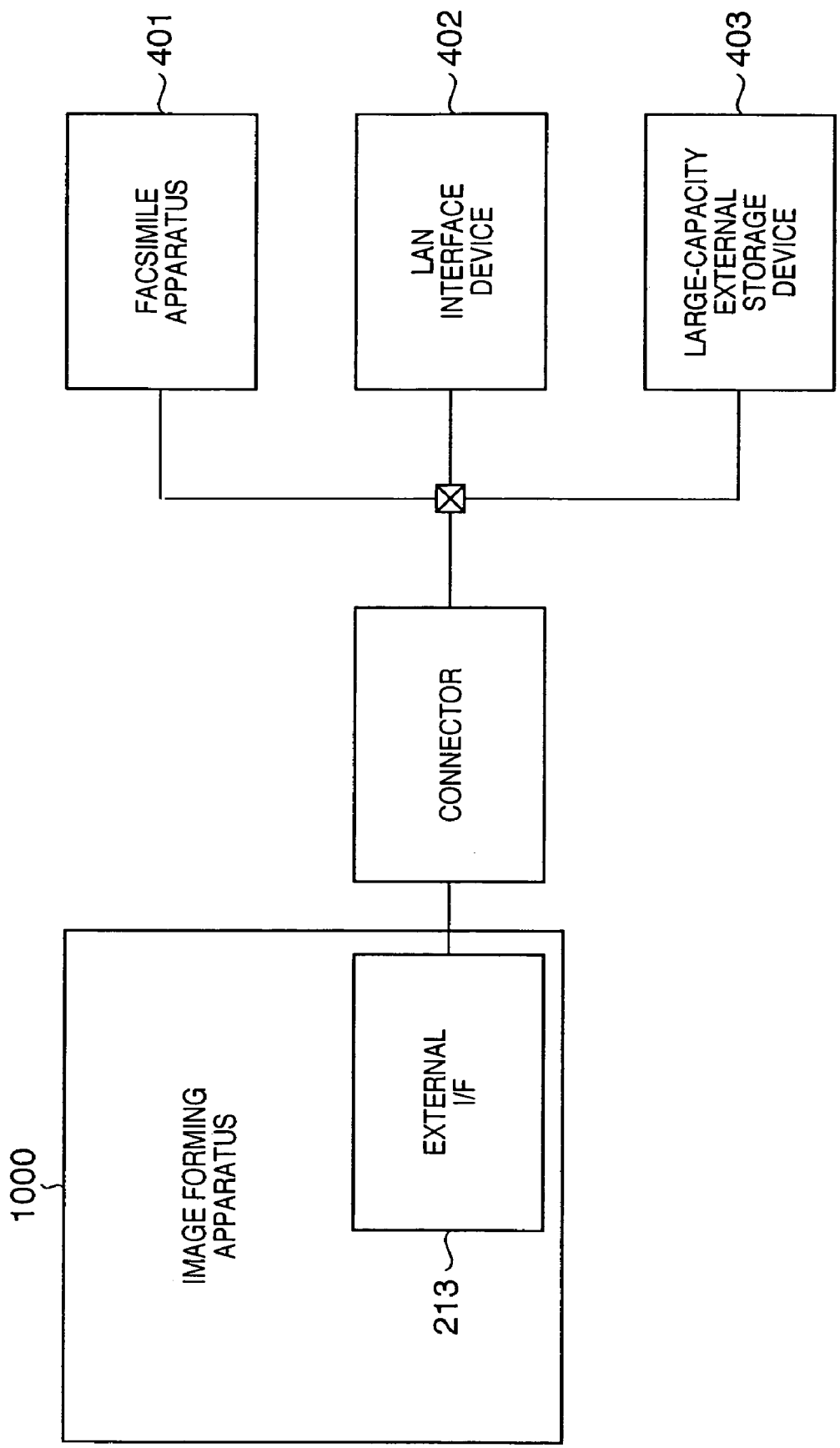
FIG. 4 is a block diagram showing the arrangement of peripheral devices of the image forming apparatus according to the first embodiment.

The external I/F 213 is an interface used to exchange image information, code information, and the like with an apparatus outside the image processing apparatus. More specifically, the external I/F 213 can connect a facsimile apparatus 401, LAN interface 402, external large-capacity storage device 403, and the like, as shown in FIG. 4. Note that exchange procedure control of image information and code information with the facsimile apparatus 401, LAN interface 402, and external large-capacity storage device 403 is implemented by intercommunications between the facsimile apparatus 401, LAN interface 402, and external large-capacity storage device 403, and the system controller 301 of the control board 200.

Figure 5:
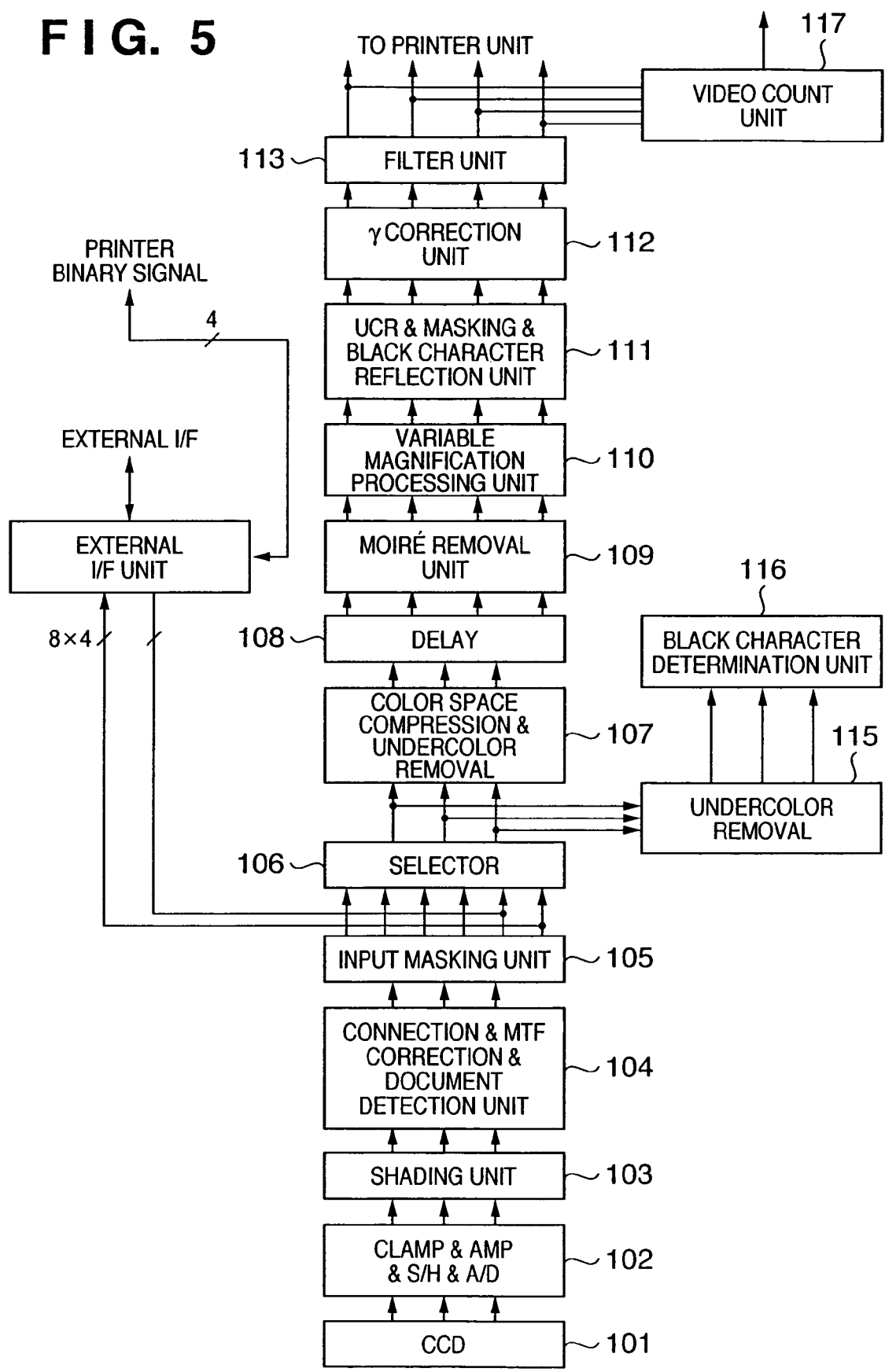
FIG. 5 is a block diagram of an image processor according to the first embodiment.

The digital image processor 212 will be described in detail below. FIG. 5 is a block diagram showing the detailed arrangement of the digital image processor 212.

A document on the platen reflects light beams coming from the light sources 203 and 204, and the reflected light is guided to the CCD 101 to be converted into an electrical signal (if the CCD 101 comprises a color sensor, RGB color filters may be arranged in line on a 1-line CCD in the order of RGB, R, G, and B filters may be arranged on respective CCDs of a 3-line CCD, on-chip filters may be adopted, or filters may be arranged independently of the CCD). The electrical signal (analog image signal) is input to the image processor 212. In the image processor 212, a clamp & Amp. & S/H & A/D unit 102 samples/holds (S/H) the input signal, cramps its dark level to a reference potential, amplifies the signal to a predetermined amplitude (the order of these processes is not limited to that described above), and A/D-converts the processed signal into, e.g., RGB 8-bit digital signals.

The RGB signals undergo shading correction and black correction in a shading unit 103. The corrected RGB signals are processed by a connection & MTF correction & document detection unit 104. The connection process corrects signal timings to match scan positions for three lines by adjusting the delay amounts of respective lines in accordance with the scan speed, since the scan positions of respective lines are different when the CCD 101 comprises a 3-line CCD. The MTF correction process corrects a change in MTF since the scan MTF changes depending on the scan speed and magnification. The document detection process recognizes a document size by scanning a document on the platen. The digital signals whose scan position timings have been corrected undergo correction processes of the spectral characteristics of the CCD 101 and those of the light sources 203 and 204 and reflection umbrellas 205 and 206 by an input masking unit 105. The outputs from the input masking unit 105 are input to a selector 106 which can switch to external I/F signals.

The signals output from the selector 106 are input to a color space compression & undercolor removal & LOG conversion unit 107 and an undercolor removal unit 115. The signals input to the undercolor removal unit 115 undergo undercolor removal, and are then input to a black character determination unit 116 which determines if the input signals form a black character in a document, thus generating a black character signal from the document. In the color space compression & undercolor removal & LOG conversion unit 107 which receives other outputs from the selector 106, the color space compression process checks if the scanned image signals fall within a range that can be reproduced by a printer. If the scanned image signals fall within that range, the process outputs the input signals intact; otherwise, the process corrects the image signals so that they fall within the range that can be reproduced by the printer. Then, an undercolor removal process is executed, and the LOG conversion process converts the RGB signals into CMY signals. The timing of the output signals from the color space compression & undercolor removal & LOG conversion unit 107 is adjusted by a delay 108 to be matched with that of the signal generated by the black character determination unit 116. These two types of signals undergo moire removal by a moire removal unit 109, and then undergo a variable magnification process in the main scan direction by a variable magnification processing unit 110.

In a UCR & masking & black character reflection unit 111, the CMY signals processed by the variable magnification processing unit undergo a UCR process to generate CMYK signals, which, in turn, undergo a masking process to be corrected to signals suited to the printer outputs. In addition, the determination signal generated by the black character determination unit 116 is fed back to the CMYK signals. The signals processed by the UCR & masking & black character reflection unit 111 undergo density adjustment by a gamma correction unit 112, and then undergo a smoothing or edge process by a filter unit 113. In this case, the correction values of the gamma correction unit 112 can be varied by setups from the system controller 301, so that CMYK density adjustment values can be set to vary CMYK density values.

<Arrangement of Printer Unit>

Figure 1:
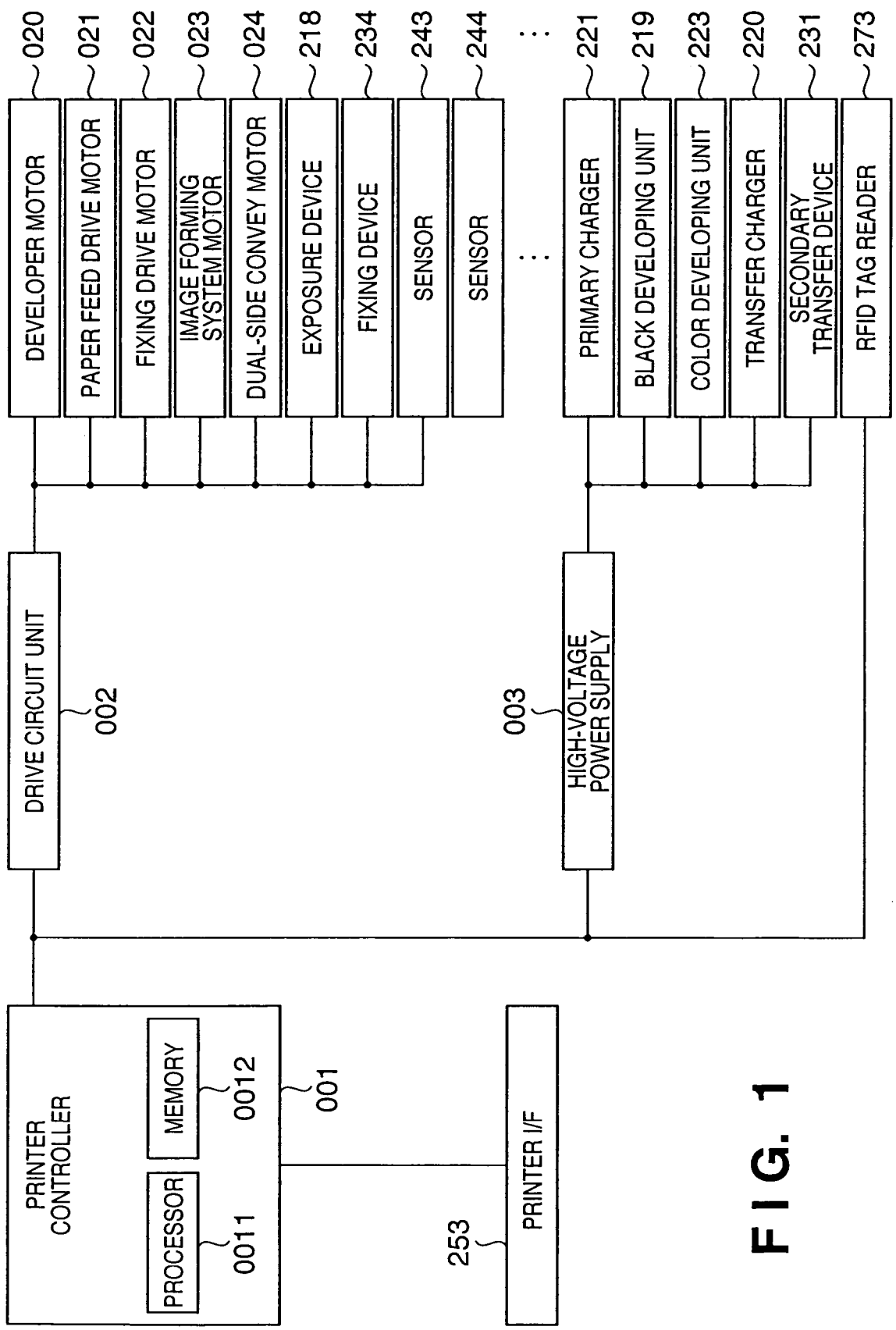
FIG. 1 is a control block diagram of an image forming unit according to the first embodiment.

The arrangement of the printer unit will be described below. A lower portion of FIG. 2 shows principal part of the arrangement of a full-color printer unit 2002 as an example of the image forming apparatus 1000 according to the present invention. FIG. 1 is a block diagram of a printer controller 001 for controlling the printer unit 2002, circuits to be controlled by the printer controller 001, and the like. The printer unit 2002 will be described below with reference to FIGS. 1 and 2 together.

A photosensitive body drum (to be simply referred as a "photosensitive drum" hereinafter) 225 as an image carrier is rotatable in the direction of an arrow A by an image forming system motor 023. A primary charger 221, exposure device 218, black developing unit 219, color developing unit 223, transfer charger 220, and cleaner device 222 are arranged around the photosensitive drum 225.

The black developing unit 219 is a developing device for monochrome development, and develops a latent image on the photosensitive drum 225 by K toner. The color developing unit 223 comprises three developing devices 223Y, 223M, and 223C for full-color development. The developing devices 223Y, 223M, and 223C respectively develop latent images on the photosensitive drum 225 by Y, M, and C toners. Upon developing a latent image by each color toner, the developing unit 223 is rotated in the direction of an arrow R by a developer motor 020, so that the developing unit of the corresponding color contacts the photosensitive drum 225.

Toner images of respective colors developed on the photosensitive drum 225 are transferred in turn onto a belt 226 as an intermediate transfer medium by the transfer charger 220, so that the four color toner images are superposed. The belt 226 is looped on rollers 227, 228, and 229.

Of these rollers, the roller 227 is coupled to the image forming system motor 023, and serves as a driving roller for driving the belt 226. The roller 228 serves as a tension roller which adjusts the tension of the belt 226. The roller 229 serves as a backup roller of a transfer roller 231 as a secondary transfer device. A transfer roller insertion/removal unit 250 is a drive unit which brings the transfer roller 231 into contact with the belt 226 or removes it from the belt 226. A belt cleaner 232 is arranged at a position facing the roller 227 to sandwich the belt 226 between them. A belt cleaner insertion/removal unit 268 is a drive unit which brings the belt cleaner 232 into contact with the belt 226 or removes it from the belt 226. When the belt cleaner 232 moves in the insertion direction by the belt cleaner insertion/removal unit 268, the residual toner on the belt 226 is scraped off by a blade.

Each of print media stored in cassettes 240 and 241 and a manual insertion paper feed unit 253 is fed to a nip portion, i.e., a contact portion between the secondary transfer device 231 and belt 226 by a registration roller 255 and paper feed roller pairs 235, 236, and 237 using a paper feed drive motor 021 as a drive source. In this case, the secondary transfer device 231 contacts the belt 226 by driving the transfer roller insertion/ejection unit 250 in the contact direction. Toner images formed on the belt 226 are transferred onto a print medium at this nip portion, and are thermally fixed by a fixing device 234. The print medium is then exhausted outside the apparatus by a fixing drive motor 022. Note that the cassettes 240 and 241 and manual insertion paper feed unit 253 respectively have out-of-sheet sensors 243, 244, and 245 so as to detect the presence/absence of print media. Also, the cassettes 240 and 241 and manual insertion paper feed unit 253 respectively have paper feed sensors 247, 248, and 249 for detecting pickup errors of print media. Furthermore, readers 273 which can read out and write data from and in a recording medium attached to a sheet, e.g., a wireless tag such as an RFID tag or the like are provided in correspondence with the cassettes. Since this embodiment uses an RFID tag as the recording medium, each reader 273 will be referred to as an RFID tag reader hereinafter.

The color printer with the above arrangement executes image formation as follows.

The convey operation of a print medium in the paper feed unit will be explained first. Print media stored in the cassettes 240 and 241 and manual insertion paper feed unit 253 are conveyed one by one onto a paper feed path 266 by pickup rollers 238, 239, and 254. When a print medium on the paper feed path 266 is conveyed to the registration roller 255 by the paper feed roller pairs 235, 236, and 237, a registration sensor 256 immediately before the registration roller 255 detects passage of the print medium. At the time of detection of passage of the print medium by the registration sensor 256, in this embodiment, the convey operation is temporarily interrupted after an elapse of an appropriate period of time. As a result, the print medium bumps into the registration roller 255 which stands still, and its conveyance stops. In this case, the print medium is fixed in position so that the end portion of the print medium in the traveling direction becomes perpendicular to the convey path. If the convey direction of the print medium has deviated from the convey path, i.e., skew has occurred, paper feed path convey direction correction is made. This process is normally called paper feed registration adjustment. The paper feed registration adjustment is indispensable to minimize any skew of the print medium in the image forming direction in the subsequent processes. After the paper feed registration adjustment, the registration roller 255 is started to feed the print medium to the secondary transfer device 231.

Next, a sequence for forming an image on the print medium fed to the secondary transfer device 231 will be described below. A voltage is applied to the charger 221 to uniformly negatively charge the surface of the photosensitive drum 225 by a predetermined charge portion potential. Subsequently, the exposure device 218 which comprises a laser scanner exposes so that an image portion on the charged photosensitive drum 225 has a predetermined exposure portion potential, thus forming a latent image. The exposure device 218 is turned on/off on the basis of an image signal, thereby forming a latent image corresponding to an image.

Developing rollers of the black developing device 219 and color developing device 223 are applied with a developing bias which is set in advance for each color. The latent image is developed by toner and is visualized as a toner image when it passes the position of the developing roller. The toner image is transferred onto the belt 226 by the transfer device 220, and is also transferred onto the print medium conveyed from the paper feed unit by the secondary transfer device 231. After that, the print medium is conveyed to the fixing device 234 via a fixing conveyor belt 230. The fixing device 234 charges the toner image by pre-fixing chargers 251 and 252 so as to compensate for the attraction force of toner and to prevent image disturbance, and thermally fixes the toner image by a fixing roller 233. After that, the convey path is switched to an exhaust path 258 side by an exhaust flapper 257, and the print medium is fed to a finisher unit 280. The print medium which does not require any post-processes in this finisher unit is conveyed intact in the apparatus, and is exhausted onto an exhaust tray 242. If the image forming mode that requires a post-process (e.g., stapling) is set, the finisher unit 280 stacks a required number of print media that have completed image formation. These print media are sorted by a sort unit 281, and then undergo a staple process by a staple unit 282. The print media are then exhausted onto the exhaust tray 242.

In case of a full-color print process, four color toner images are superposed on the belt 226, and are then transferred onto a print medium. Residual toner on the photosensitive drum 225 is removed and recovered by the cleaner device 222 after a pre-cleaning device (not shown) charges the toner to allow easy cleaning. Finally, the photosensitive drum 225 is uniformly discharged around zero bolt by a discharge device (not shown), thus preparing for the next image formation cycle.

The image formation timing of the color printer is controlled with reference to a predetermined position on the belt 226. The belt 226 is looped on the rollers including the driving roller 227, tension roller 228, and backup roller 229, and is given a predetermined tension by the tension roller 228.

A reflection sensor 224 for detecting a reference position is arranged between the driving roller 227 and roller 229. The reflection sensor 224 detects marking such as a reflection tape or the like provided to the end portion of the outer circumferential surface of the belt 212, and outputs an I-top signal.

The length of the outer circumferential surface of the photosensitive drum 225 and the peripheral length of the belt 226 meet an integer ratio given by 1:n (n is an integer). With this setup, the photosensitive drum 225 rotates an integer number of times per round of the belt 226, and it returns to the same state as that one round before of the belt 226. Hence, color misregistration due to rotation nonuniformity of the photosensitive drum 225 can be avoided upon superposing four colors on the intermediate transfer belt 226 (the belt makes four rounds).

In the aforementioned intermediate transfer image forming apparatus, the exposure device 218 which comprises a laser scanner starts exposure an elapse of a predetermined period of time after detection of the I-top signal. As described above, since the photosensitive drum 225 rotates an integer number of times per round of the belt 226 and it returns to the same state as that one round before of the belt 226, toner images are always formed at the same position on the belt 226. Although the toner image size changes depending on the paper size, the belt 226 has a range where no toner image is formed.

The belt 226 has a belt length for two toner images in case of a short paper size image. Especially, upon forming a full-color image by superposing four color toner images, two images can be formed for a time required to rotate the belt four times, thus improving the productivity.

Next, the operation upon forming an image on the reverse face of a print medium will be described below. Upon forming an image on the reverse face of the print medium, image formation on the obverse face of the print medium is done first. The image forming operation on the obverse face has been described in detail previously, and a description thereof will be omitted. In case of image formation only on the obverse face, after the toner image on the print medium is thermally fixed by the fixing device 234, the convey path is switched to the exhaust path 258 side by the exhaust flapper 257, and the print medium is exhausted onto the exhaust tray 235. However, when the print medium undergoes image formation on its reverse face, the convey path is switched to a reverse face path 259 side by the exhaust flapper 257, and the print medium is temporarily conveyed into a dual-side reverse path 261 by a dual-side convey motor 024 upon rotation of reverse rollers 260 accordingly. After that, the print medium is conveyed into the dual-side reverse path 261 by the width of the print medium in the feed direction, and its traveling direction is switched by a dual-side reverse path guide 269 upon reverse rotation of the reverse rollers and driving of dual-side path convey rollers 262. Then, the print medium is conveyed onto a dual-side path 263 with its obverse face, i.e., image-bearing face, facing down.

When print medium is conveyed along the dual-side path 263 toward re-feed rollers 264, a re-feed sensor 265 immediately before the rollers 264 detects passage of the print medium. At the time of detection of passage of the print medium by the re-feed sensor 265, in this embodiment, the convey operation is temporarily interrupted after an elapse of an appropriate period of time. As a result, the print medium bumps into the re-feed rollers 264 which stands still, and its conveyance stops. In this case, the print medium is fixed in position so that the end portion of the print medium in the traveling direction becomes perpendicular to the convey path. If the convey direction of the print medium has deviated from the convey path, i.e., skew has occurred, re-feed path convey direction correction is made. This process is normally called re-feed registration adjustment. The re-feed registration adjustment is indispensable to minimize any skew of the reverse face of the print medium in the image forming direction in the subsequent processes. After the re-feed registration adjustment, the re-feed rollers 264 are started to feed the print medium onto the paper feed path 266 again while it is upside down. The subsequent image forming operation is the same as that for the obverse face, and a description thereof will be omitted. In this way, the convey path is switched to the exhaust path 258 side by the exhaust flapper 257, and the print medium which has undergone image formation on its two faces is exhausted onto the exhaust tray. With the above operations, in this embodiment, image formation can be automatically made on the two faces of the print medium without requiring the operator to re-set the obverse or reverse face of the print medium.

Note that the printer controller 001 controls the overall printer controller 001, controls data exchange via a printer I/F, and controls a drive circuit unit 002 and high-voltage unit 003. Furthermore, the printer controller 001 controls the RFID tag readers 273 to read data written in RFID tags. These control processes may be implemented by a hardware circuit included in the printer controller 001, but may be implemented by executing a program stored in the memory 0012 by a processor 0011. In this case, the memory 0012 stores data read from the RFID tags, and a program that describes the sequence to be described later.

<Arrangement of RFID>

An explanation about RFID will be given below. FIG. 1 shows the arrangement of the printer unit 2002 to which the present invention is applied. As shown in FIG. 2, the RFID tag reader 273 for reading data of an RFID tag on each print medium is mounted as a transmitter/receiver on each cassette deck that stores print media. Note that "print medium" in this embodiment indicates those such as a print paper sheet and other materials which are used in print processes. Put simply, an RFID tag 601 (see FIG. 6) is embedded on a print medium, and the image forming apparatus side comprises the read circuit (reader) 273 for reading out information from the RFID tag 601. When print media are stored in the cassettes 240 and 241 that store print media, and a storage open/close sensor (not shown) in each cassette outputs a signal indicating the cassette is closed, a process for reading out data from each RFID tag starts in response to that information. Information of each print medium can be acquired as data by always monitoring it without detection by the storage open/close sensor. Also, the same process can be made by setting the reader used to read out data at positions where print media are stored such as a cassette deck that stores print media and the manual insertion paper feed unit 253 in addition to the cassettes 240 and 241.

Figure 6:
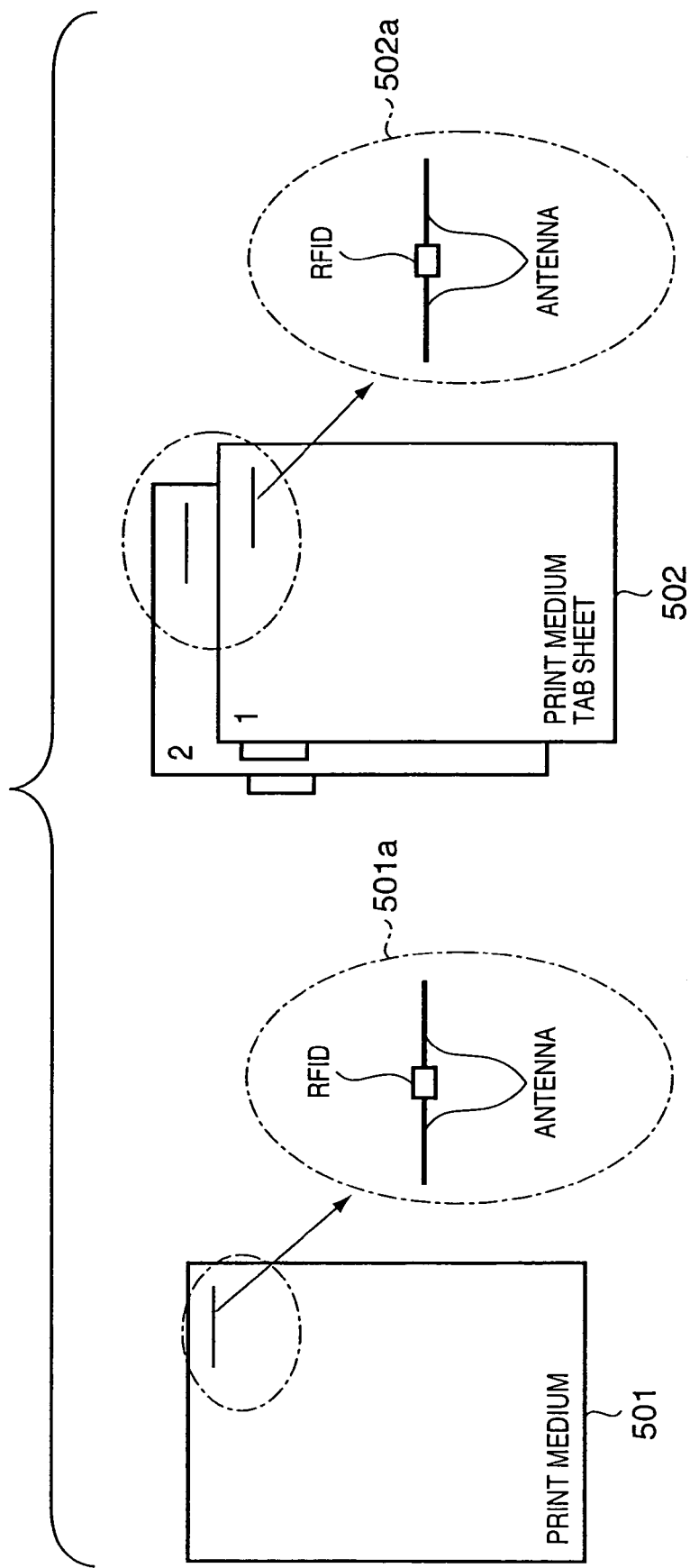
FIG. 6 is a view showing RFID tags mounted on print media according to the first embodiment.

The arrangement and operation of the RFID tag 601 will be briefly described below. FIG. 6 shows the arrangements of a print medium and that with a tab, in each of which is embedded with the RFID tag 601. RFID tags are embedded at the upper right corners of print media 501 and 502. As shown in enlarged views 501a and 502a, an antenna for transmitting/receiving a radio signal (i.e., two-way communication) is connected to each RFID tag, and is laid out along the short side of the print medium.

Figure 7:
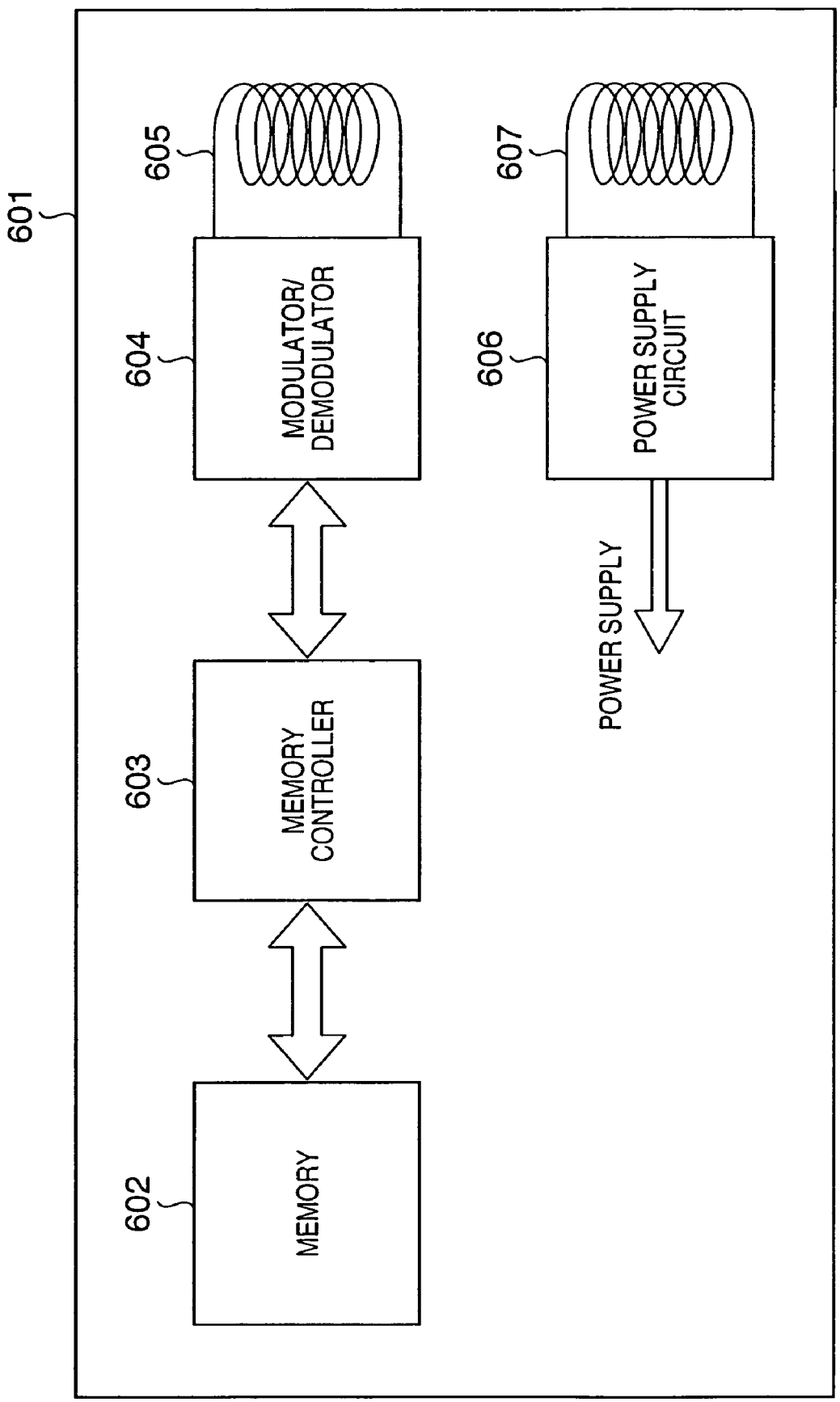
FIG. 7 is a block diagram showing the arrangement of the RFID tag according to the first embodiment.

The RFID tag 601 has a memory 602 such as an EEPROM or the like which can retain data even after power OFF, so as to store data, as shown in FIG. 7. The memory 602 has addresses according to its capacity, and 16-bit data storage fields are assured for respective addresses. A memory controller 603 makes data read and write accesses and the like of data from a coil 605 to the memory 602 in accordance with commands from the reader, which are sent via a modulator/demodulator 604.

The memory controller 603 executes read control of the memory 602 in accordance with a command transmitted from the modulator/demodulator 604. A power supply circuit 606 supplies electric power to the circuits of the RFID tag by an induced electromotive force from a coil 607. The RFID tag 601 is formed by integrating the arrangement shown in FIG. 7 on a 1-chip IC.

Upon using the RFID tags 601 in this embodiment, sheet-like print media attached with RFID tags are placed in stack, and data must be read out from the RFID tags in such state. To this end, communications must be individually or simultaneously made with all RFID tags within a communication range of the RFID tag reader 273. Such function is called an anti-collision function, a function of selectively communicating with one RFID tag is called selective access, and a function of simultaneously communicating with all tags within the communication range is called multi-access. As an RFID tag with this anti-collision function, a product "V69" is available from OMRON Corporation. This product is not the RFID tag itself used in this embodiment, but can be applied to this embodiment since it comprises a multi-access function.

<Arrangement of Read Circuit>

Figure 10:
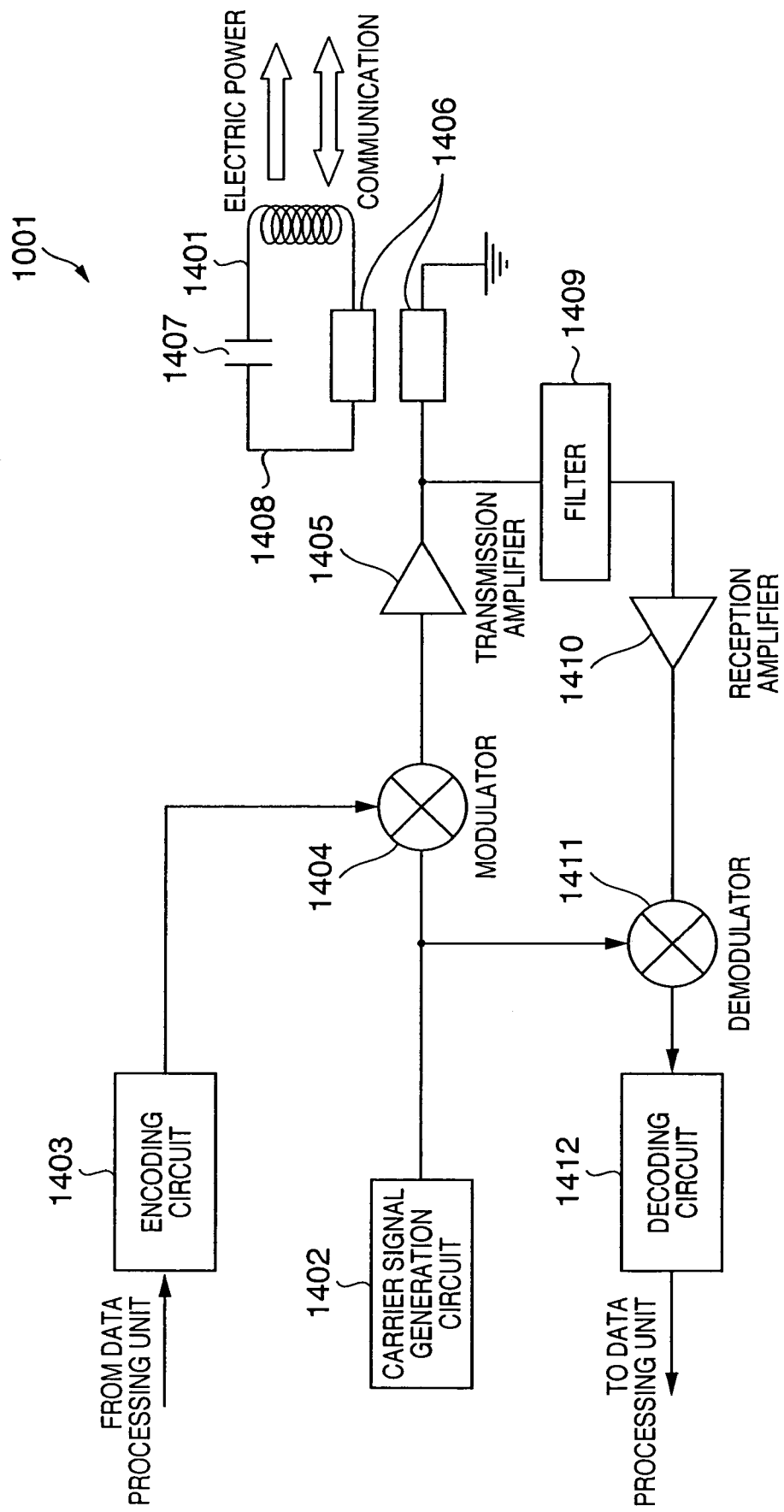
FIG. 10 is a block diagram of a read circuit which makes read control of the RFID tag via wireless, non-contact communications according to the first embodiment.

The read circuit will be described below. The aforementioned RFID tag reader 273 comprises a read circuit, which has the arrangement, as shown in FIG. 10. Both transmission of electric power and transmission/reception of communications are made between an R/W (reader and/or writer coil) 1401 provided to a read circuit 1001 and the coil 605 formed in the RFID tag 601 shown in FIG. 6 using an electromagnetic wave (radio wave) including a power transmission wave and data communication modulated wave shown in FIG. 11. Alternatively, a power transmission wave and signal wave may be transmitted using independent antennas.

Figure 11:
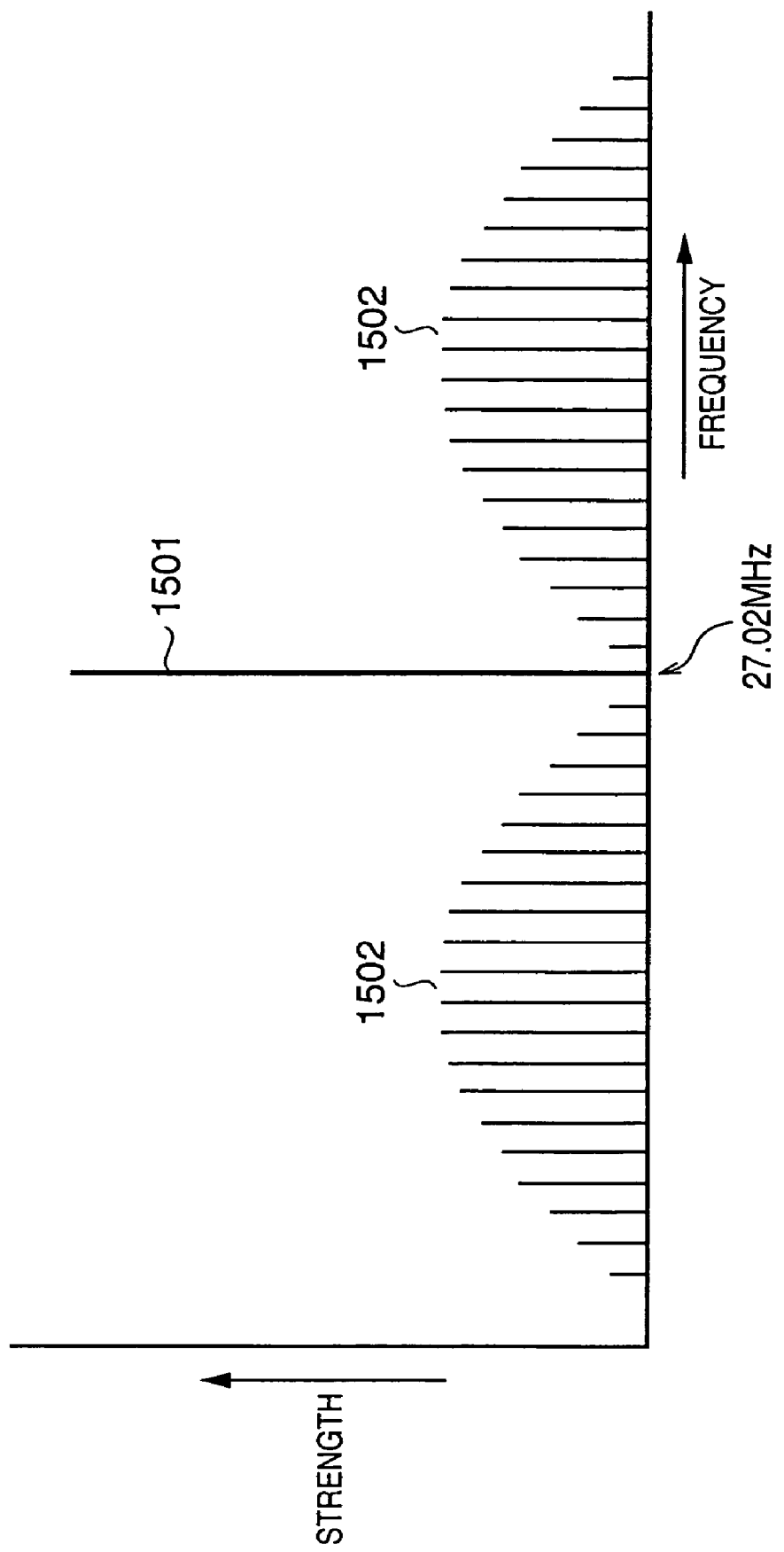
FIG. 11 is a schematic graph of carriers generated by the read circuit according to the first embodiment.

A power transmission wave 1501 of 27.02 MHz shown in FIG. 11 is received by the coil 607 in FIG. 7, and supplies electric power that drives the RFID tag 601.

A data communication modulated wave 1602 having a center frequency of 27.02 MHz is transmitted/received by the coil 605 in FIG. 7, and makes read and write accesses to the memory 602 in the RFID tag 601.

Referring to FIG. 10, the read circuit 1001 comprises an encoding circuit 1403 for encoding a carrier signal of 27.02 MHz generated by a carrier signal generation circuit 1402 as data to be transmitted to the RFID tag 601, a modulator 1404 for superposing the signal encoded by the encoding circuit 1403 on a drive signal of 27.02 MHz by amplitude modulation (Amplitude Shift Keying modulation: ASK modulation), a transmission amplifier 1405 for amplifying the ASK-modulated signal on the drive signal of 27.02 MHz by the modulator 1404, a matching circuit (feeder circuit) 1408 for coupling the signal amplified by the transmission amplifier 1405 by inductance coupling 1406, and matching its impedance via a capacitor 1407 to prevent reflection, the coil (reader and/or writer coil) 1401 for generating an electromagnetic wave so as to transmit electric power and data in accordance with the output from the matching circuit 1408 and receiving data transmitted via an electromagnetic wave from the coil 605 of the RFID tag, a filter circuit 1409 for matching the signal received by the coil (reader and/or writer coil) 1401 using the matching circuit 1408 to remove noise components from a signal generated by the inductance coupling 1406, a reception amplifier 1410 for amplifying the signal obtained via the filter circuit 1409, a demodulator 1411 for demodulating the signal amplified by the reception amplifier 1410 using the aforementioned drive signal of 27.02 MHz, and a decoding circuit 1412 for decoding the signal demodulated by the demodulator 1411 and outputting the demodulated signal as reception data.

The read circuit with this arrangement ASK-modulates transmission data transmitted from a data processor (not shown) from the coil 1401, or receives ASK-modulated data from the coil 1401.

Note that the circuit arrangement shown in FIG. 10 is a read/write circuit that allows write access in practice, and can not only read out a signal but also write a signal. This read circuit and RFID tag have a multi-access function that can simultaneously communicate with a plurality of RFID tags within the communication range of the read circuit. Also, the read circuit and RFID tag also have a selective access function of specifying a communication partner based on, e.g., a tag ID (to be described later) from a plurality of RFID tags, and communicating with only the specified partner.

<Data Format>

The data format to be transmitted from the modulator/demodulator 604 to the read circuit 1001 will be described below using FIG. 8 and FIGS. 9A and 9B.

FIG. 8 shows an example of the read control of the memory 602 which is nearly equivalent to the control of a general EEPROM. FIG. 8 shows the data format in a read mode. When the read circuit 1001 in FIG. 10 outputs a power transmission wave, the coil 607 in FIG. 7 receives this power transmission wave, and the power supply circuit 606 generates an induced electromotive force. When electric power is supplied to the RFID tag 601 based on this induced electromotive force, the memory controller 603 monitors serial data ID which is received from the coil 605 via the modulator/demodulator 604, and detects transition of a bit from 0 to 1. The first transition from 0 to 1 of the serial data DI to be monitored indicates a start bit, and data of two successive bits after the start bit serves as command data. In FIG. 8, the transition timings of data are set based on a predetermined frequency f in the circuit arrangement of the read circuit 1001 and RFID tag. Alternatively, sync clocks which oscillate at periods f may be separately generated to reliably attain synchronization in FIG. 8, command data includes bits 1 and 0, which mean a read command, as shown in FIG. 9A. Upon reception of the read command, the memory controller 603 controls the memory 602 in a read mode, the memory 602 outputs data stored at an address indicated by 4-bit data that follows the command data to the memory controller 603 as serial data DO, and the coil 605 outputs a modulated wave to the read circuit 1001 via the modulator/demodulator 604.

The memory 602 has a capacity of 256 bits since its address and data respectively 4- and 16-bit specifications. The address map of the memory 602 is determined in advance as shown in FIG. 9B so that the ID of the RFID tag itself is stored at addresses 00h to 02h; the manufacturer ID of a print medium embedded with the RFID tag at 03h; the year and month of manufacture at 04h; sheet type (paper type) information of the print media embedded with the RFID tag at 05h; size (paper size) information of the print medium at 06h; thickness (paper thickness) information of the print medium at 07h; color (paper color) information of the print medium at 08h; and tab position (tag position for an index sheet) of the print medium at 09h. The read circuit reads data according to this address map and interprets it, thus reading out information (information about the print medium) of the print medium. The size (paper size) information of the print medium at location 06h may indicate length of each edge of a print sheet used as the print medium.

<Control Sequence of Image Forming Apparatus>

The image forming apparatus which reads out information from the RFID tag 601 embedded in each print medium and executes control based on the readout data will be described below.

As described above, information of the RFID tag 601 embedded in each print medium includes the ID of the RFID tag itself at addresses 00h to 02h, and medium information at the subsequent addresses: the manufacturer ID of the print medium (print sheet) at 03h; the year and month of manufacture at 04h; sheet type information at 05h; size information of the print medium (print sheet) at 06h; thickness information of the print medium (print sheet) at 07h; color information of the print medium (print sheet) at 08h; and tab position of the print medium (print sheet) at 09h, as shown in FIG. 9B. The RFID tag readers 273 which are arranged near the cassettes 240 and 241 that store print media (print sheets) read out these pieces of information after the power switch of the image forming apparatus is turned on. Note that each print medium (print sheet) is manufactured and distributed while the above information is recorded in its RFID tag, or the information is recorded in the RFID tag before the print medium is used. The tag IDs are serially assigned and, for example, numbers which increment one by one in ascending order are assigned in turn from the uppermost one of a bundle of sheets.

The printer controller 001 sets and controls the image forming condition on the basis of the readout data. This sequence will be described below with reference to the flowcharts of FIGS. 13 to 15.

Figure 13:
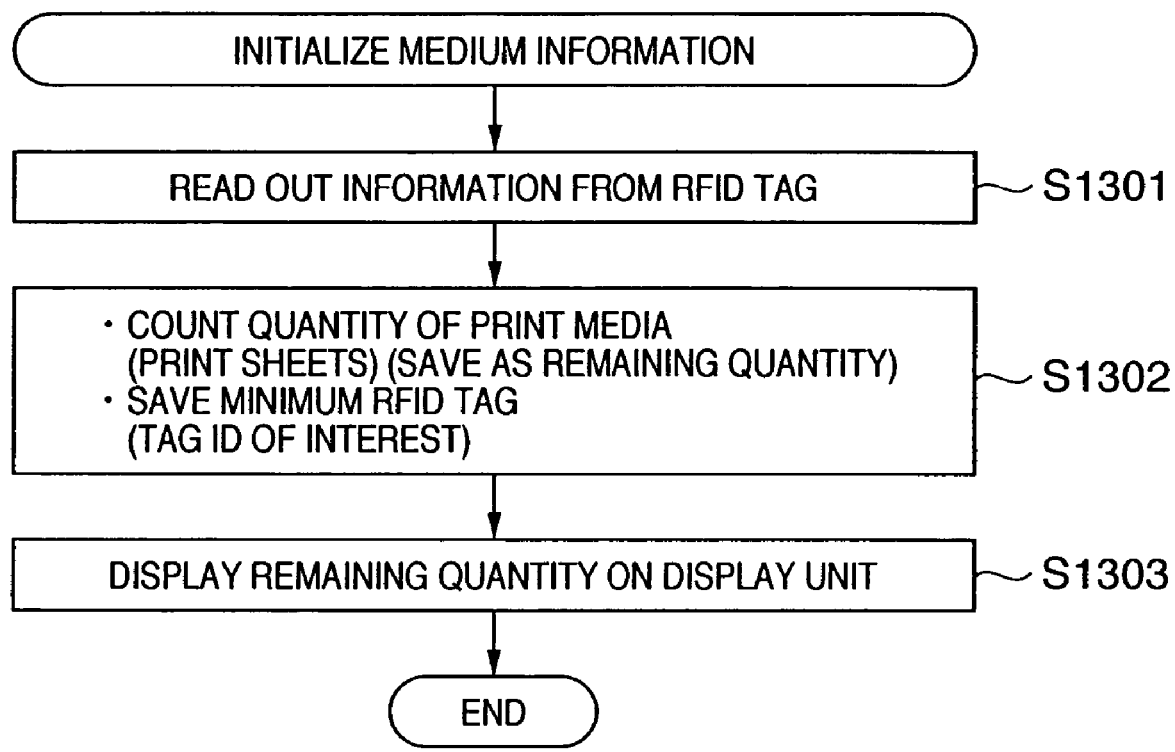
FIG. 13 is a flowchart of the sequence for reading out medium information from RFID tags of print media set on an exhaust tray and counting the number of media according to the first embodiment.

FIG. 13 shows a sequence executed when the printer controller 001 initializes medium information to be held in the memory 0012. The medium information is held for each paper feed cassette, and includes the following information. First, the minimum one of the tag IDs stored in the RFID tags of print media stacked in the paper feed cassette is saved as the tag ID of interest of each cassette. Second, the remaining quantity of media in the cassette is saved. FIG. 13 is executed when each paper feed cassette is loaded. Data at addresses 00*h* to 02*h* indicates the ID of the RFID tag itself. By reading this data, the printer controller 001 can recognize the quantity of print media. The information read from each RFID tag is saved in a storage unit such as the memory 0012 or the like. This storage area will be referred to as a first storage unit hereinafter. If 300 tag IDs are read out, it is determined that 300 print media are stored. If this quantity is displayed on the display unit of the console 302, the remaining quantity of print media can be accurately displayed.

Figure 12:
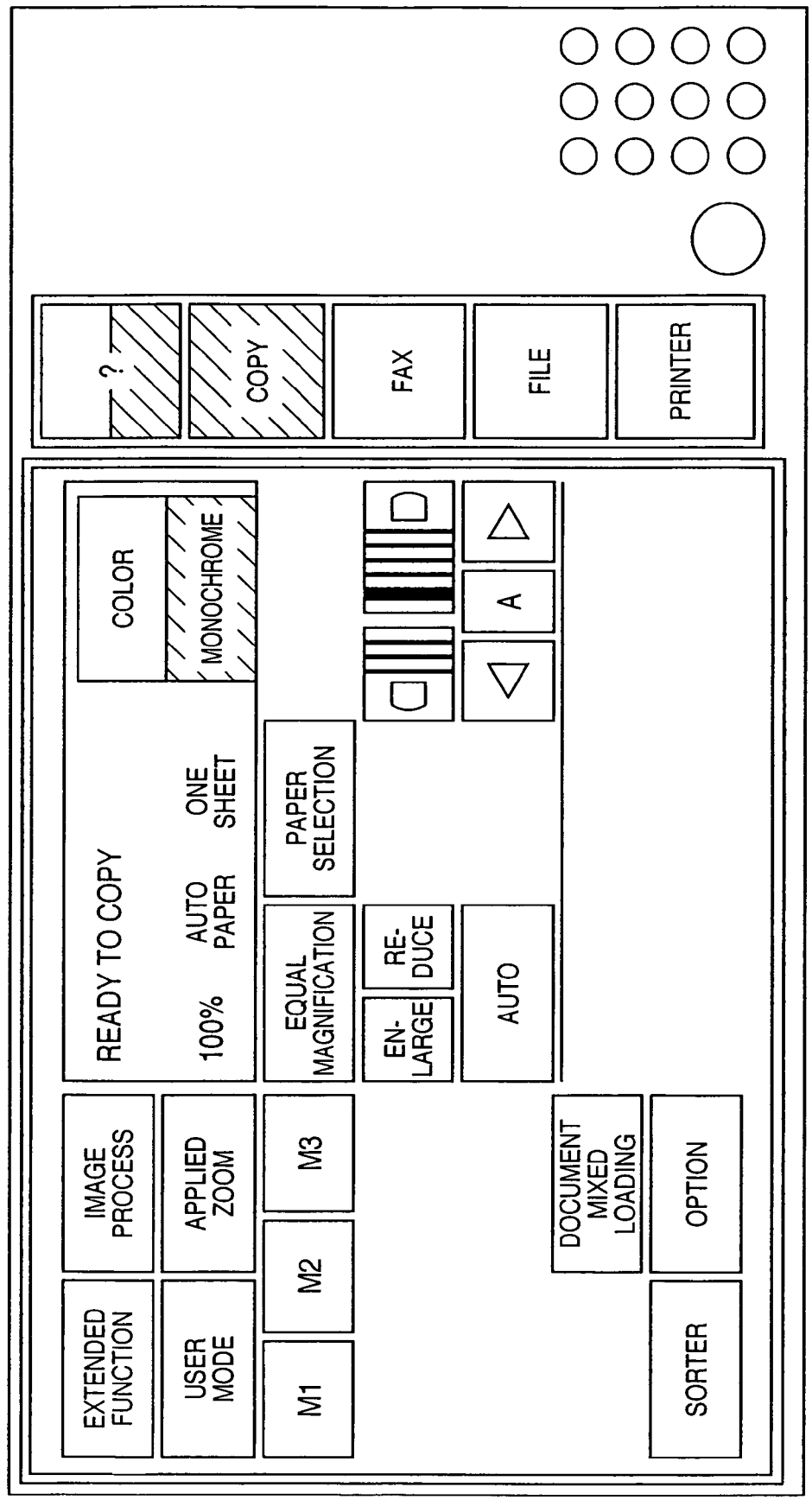
FIG. 12 shows a control panel of a console of the image forming apparatus according to the first embodiment.

For this purpose, the read circuit 273 corresponding to each paper feed cassette reads out information shown in FIG. 9B (especially, the tag ID) from RFID tags. At this time, the read circuit 273 reads information from all tags by multi-access (step S1301). The number of readout tag IDs is counted, and is saved as the remaining quantity of print media. At the same time, the minimum value of the readout tag IDs is saved as the tag ID of interest (step S1302). Finally, the remaining quantity of print media is displayed on the console shown in FIG. 12. Means for counting the number of tag IDs stored in the first storage unit will be referred to as a first count unit hereinafter.

With this sequence, for example, when the paper feed cassette is replenished with paper sheets, the remaining quantity of paper sheets and the tag ID of the uppermost paper sheet of the paper feed cassette are specified. Note that print media are assigned with tag IDs in ascending order, and are stored in the paper feed cassette so that the uppermost paper sheet has the minimum tag ID, i.e., it is fed first.

<Print Process>

Figure 14:
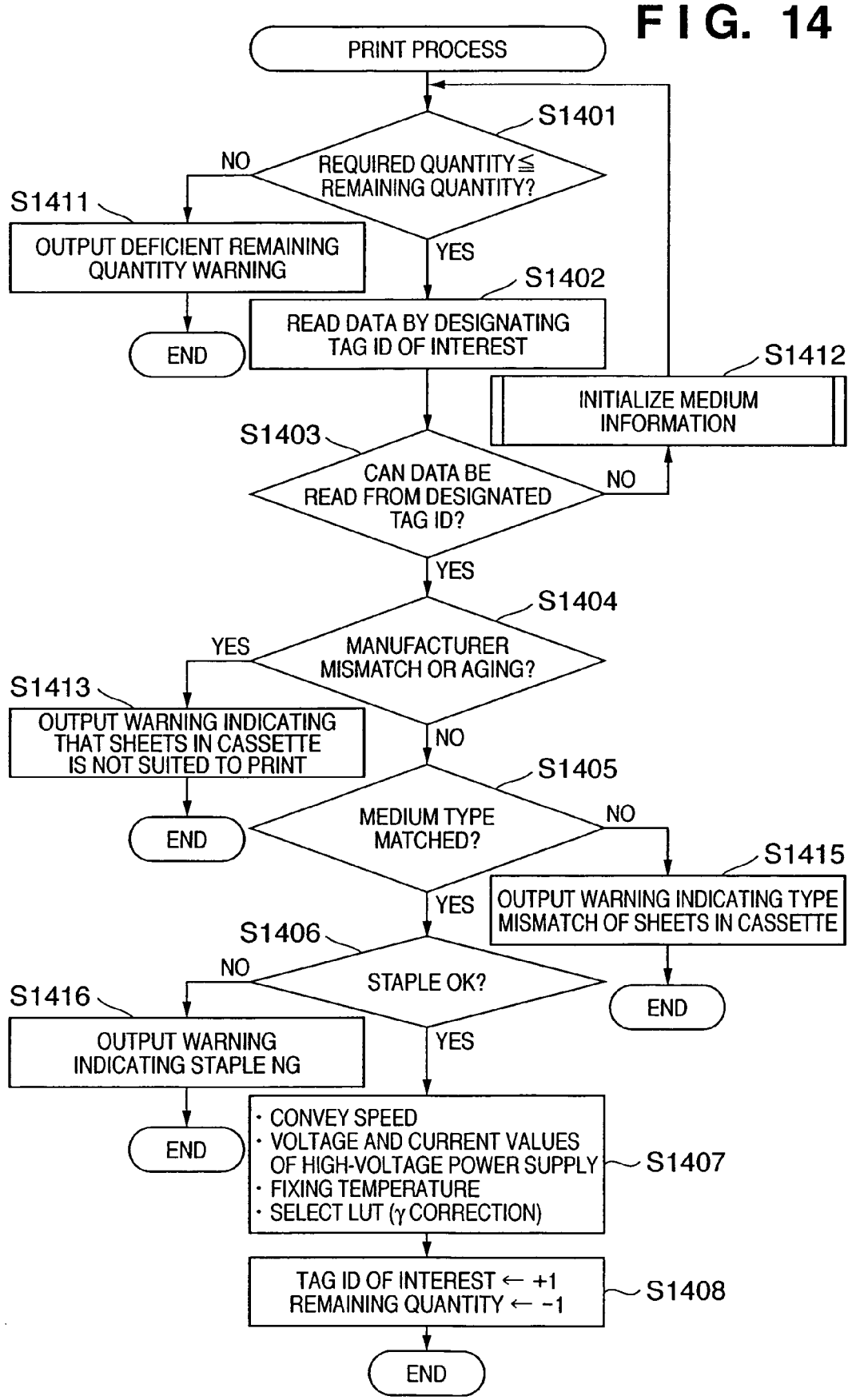
FIG. 14 is a flowchart of the print process sequence according to the first embodiment.

In a print process, the sequence shown in FIG. 14 is executed. Upon executing a print process, a print mode (including designation of the print resolution, paper type, size, and the like) is designated in advance, and the designated contents are stored in the memory 0012.

It is checked if the quantity required for a print job to be printed is equal to or smaller than the remaining quantity (step S1401). If the required quantity is larger than the remaining quantity, a warning message that advises accordingly is displayed on the console (step S1411). The required quantity indicates the number of print sheets required for image formation, that is, the quantity of the print media required in an image forming mode set from the console 302. In step S1411, control for displaying a deficient number of sheets by calculating it may be made. Note that the required quantity which is required for the print job to be processed is calculated on the basis of the designated image forming mode, e.g., Nin1 designation (designation for printing N pages per sheet in a reduced scale), designation of a plurality of number of copies, and the like. In step S1401, the number of paper sheets (the quantity of print media) is calculated in correspondence with the designated image forming mode. That is, step S1401 includes a second count unit comparing the number of print sheets required for image formation with the remaining quantity of the print sheets. Note that the image forming mode is input from the console 302, and is stored in the storage unit such as the memory 0012 or the like. The quantity of the print media required for image formation may be included in the image forming mode set from the console 302.

If the remaining quantity is sufficiently larger than the required quantity, the tag ID of interest of the current paper feed cassette of interest is designated, and the read circuit 273 reads out information from an RFID tag (S1402). At this time, all pieces of medium information shown in FIG. 9B are read out. In this way, information of a print medium to be printed can be read out. If information cannot be read out (step S1403—NO), a medium initialization process in FIG. 13 is executed (step S1412) to update the tag of interest, and the process is repeated from step S1401. If the designated tag ID cannot be read out even after execution of step S1412, an error message is displayed, and the process is aborted. Alternatively, a print medium process may be skipped, and a conventional print process may be executed instead.

If the information of the print medium with the tag ID of interest can be acquired, the following control is executed based on that information (medium information).

It is checked based on the ID of the manufacturer at address 03*h* and information of the year and month of manufacturer of the medium information, and data pre-stored in the print controller 001 of the image forming apparatus if that medium is a recommended print medium, or if the print medium deteriorates due to an elapse of too much time after the date of manufacture of that medium (S1404). If the print medium is not a recommended print medium or too much time has elapsed after manufacture, control is made to display a message that advises accordingly on the display unit of the console 302 (S1413).

The paper type information read out from address 05*h* of the medium information is compared with the type of print medium set in the image forming mode designated from the console 302 or the like (step S1405). If the readout type of print medium does not match that of set print medium, a message that advises accordingly is displayed without starting the image forming operation (step S1415). If the two types match, the flow advances to step S1406.

It is checked in step S1406 if a staple process can be applied. For this purpose, the total thickness of print media stacked in a post-process (e.g., a staple process) executed after image formation is calculated (corresponding to a third count unit) based on thickness of the print medium (i.e., thickness of a print sheet) and the image forming mode designated from the console 302, that is, the number of print sheets required for image formation. The calculated total thickness of print media is compared with the maximum load total thickness of print media that can be stapled by the staple unit 280. If the calculated total thickness of print medium is larger than the maximum load total thickness that can be stapled, a message that advises accordingly is displayed without starting the image forming operation (step S1416). If the calculated total thickness is equal to or smaller than the maximum load total thickness that can be stapled, control is made to start the image forming operation (step S1407).

In step S1407, for example, the following control is made. The paper type information of the print medium is read out from address 05*h* of the medium information. The paper type information includes information such as surface property, elasticity, and the like of the print medium, or the printer controller 001 pre-stores information such as surface property, elasticity, and the like of the print medium in correspondence with a paper type code or the like. Information such as surface property, elasticity, and the like of the print medium can be read from such information. The size information and thickness information of the print medium can be acquired from addresses 06*h* and 07*h* of the medium information, respectively.

Based on these pieces of information, the printer controller 001 sets an optimal convey speed of a print medium upon image formation, and the drive circuit unit 002 executes speed control of the developer motor 020, the paper feed drive motor 021, the fixing drive motor 022, the image forming system motor 023, the dual-side convey motor, and a polygon motor (not shown) in the exposure device 218 to make image formation at an optimal speed. For example, if the fixing unit excessively heats an OHP sheet or the like, the medium itself may warp, or may be adhered to a heater. Hence, the convey speed of such medium is set to be higher several % than a normal paper medium. In case of a thick medium, it readily causes a positional deviation at a bent portion of the convey path. In such case, the convey speed is set to be lower than a normal copy sheet. If the print medium is one that readily causes a deviation due to its material and elasticity (e.g., a slippery material), the convey speed is set to be lower. On the other hand, if the print medium is one that degenerates if it is exposed to high temperatures, the convey speed is set to be higher. Of course, these setups are merely examples.

The printer controller 001 sets an optimal transfer condition to the type and thickness of print medium (i.e., voltage and current values to be supplied from the high-voltage power supply 003 to the secondary transfer device) on the basis of the paper type information and thickness information read out from addresses 06*h* and 07*h*. For example, for a thick medium, the high-voltage power supply 003 is set to supply a higher transfer voltage value than a thin medium (or to assure a sufficient current value) as the transfer condition, thus optimizing the transfer condition and obtaining a high-quality image. The printer controller 001 executes control for setting the fixing temperature of the fixing device 234, which is optimal to the type and thickness of print medium. For example, if the medium is, for example, an OHP sheet or the like that degenerates when the temperature of the fixing unit exceeds a predetermined value, control is made to lower the temperature of the fixing unit. Also, since the RFID tag itself may be damaged if it is exposed to high temperatures, temperature control may be made to fix a print medium attached with the RFID tag at a temperature lower than that for a medium without any tag. This temperature is determined based on the specification of the RFID tag itself.

Also, an optimal image condition may be set by changing setups of voltage and current values of the high-voltage power supply 003 to be applied to the primary charger 221 and developing units 219 and 223 in addition to the transfer device. Since the amount of toner to be attached to a medium changes depending on the voltage and current values of the secondary transfer device and primary transfer device, if the medium is, for example, an OHP sheet or the like that readily causes deterioration of an image due to scattering of toner or the like, the voltage and current are controlled to lower a charge potential to be charged, thus reducing the toner amount.

The aforementioned control of the motor speeds and voltage and current values is made when the printer controller 001 sets values corresponding to the motor speeds and voltage and current values determined based on the medium type and the like in registers provided to the drive circuit unit 002 and high-voltage power supply 003.

In addition, the color information of the print medium is read out from address 08*h* of the medium information. In case of a color image forming apparatus like in this embodiment, since image formation colors change due to the influence of the background color a print medium, the γ correction unit 112 in the image processing block shown in FIG. 5 changes correction values of YMCK colors, thus allowing control for minimizing color appearance variations of the image forming unit due to the influence of the background color of the print medium, and obtaining an optimal color appearance of an image. For example, the background (print medium) color is readily reflected on a low-density portion, but as for a high-density portion, the background color is covered by toner and its color is hardly reflected on an image. For example, for a low-density portion, correction is made by calculating color component data according to the ratio of YMCK colors from color component information of the background color, and subtracting calculated values according to the ratio of color components from image data. Conversely, for a developing color which is readily influenced by the background color, the correction values are changed to apply correction that adds the calculated values. The correction amounts are determined based on the background color obtained from the medium information and image data.

Upon completion of the aforementioned control, the tag ID of interest is incremented by 1 to select the next tag ID as the tag ID of interest, and the remaining quantity of media is decremented by 1 at the same time (step S1408).

With the above sequence, information associated with a print medium itself is read from the RFID tag attached to the print medium, and the print sequence can be controlled based on the read information.

<Order Management of Tab Sheets>

Figure 15:
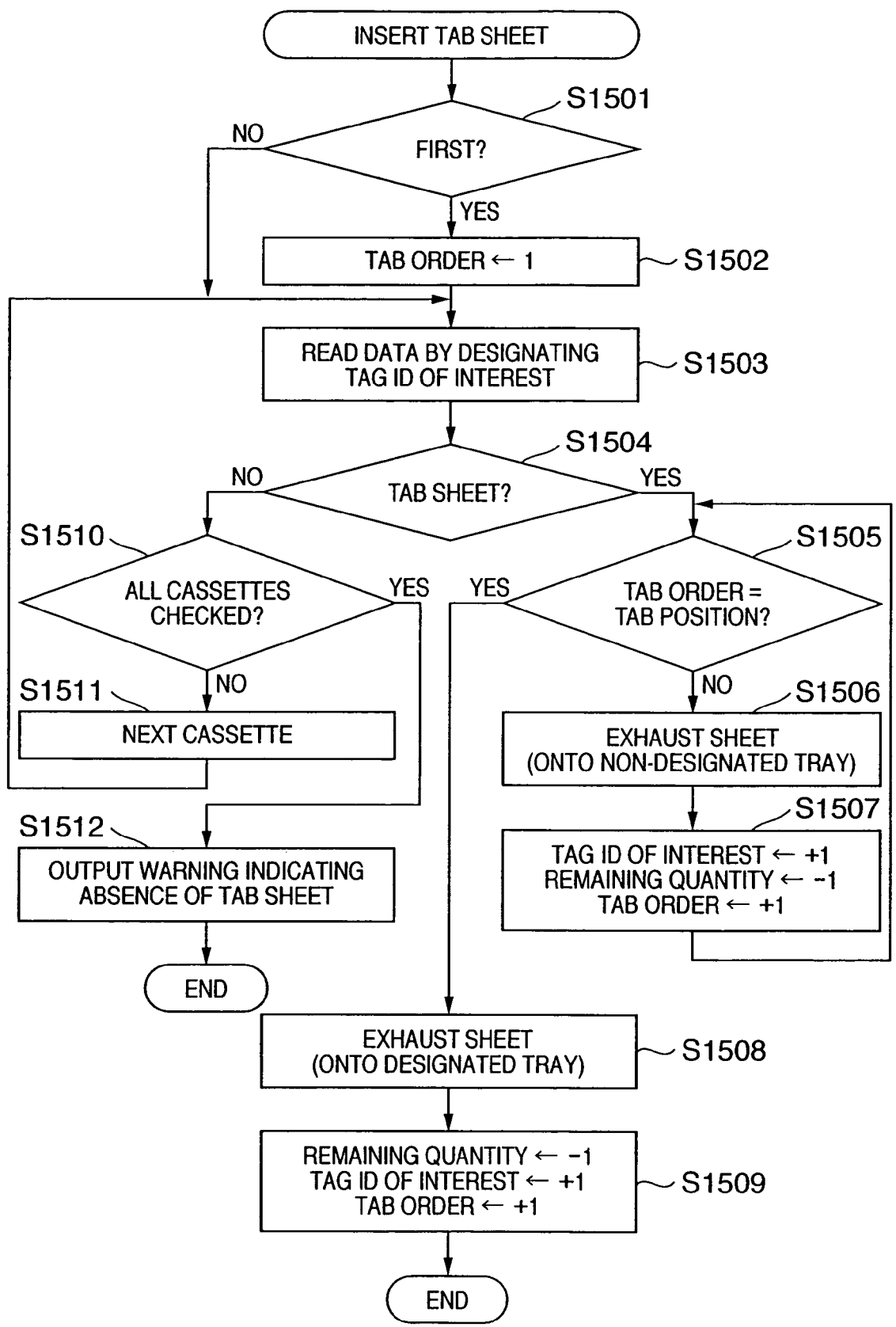
FIG. 15 is a flowchart of the sequence of a tag insert process according to the first embodiment.

The sequence of a tab insertion process in a process of a print job which instructs to insert tab sheets at designated positions will be described below with reference to FIG. 15. The sequence shown in FIG. 15 is executed after it is confirmed that the paper feed cassette which stacks tab sheets is prepared. The tab sheets are stacked in the order of tab positions. That is, a predetermined number of tab sheets normally form one set, and the tab sheets are set in the paper feed cassette in that order.

It is checked if a tab sheet to be inserted is the first one (step S1501). If the tab sheet to be inserted is the first one, a tab sheet with the uppermost tab position is to be inserted. Hence, if the tab sheet to be inserted is the first one, 1 is set in a tab order variable assured on the memory (step S1502). Whether or not tab sheet is the first one can be determined as follows. That is, when the system controller 301 which manages a print job and the like can determine that a tab sheet insertion command which appears first in the print job indicates the first tab sheet, the aforementioned checking step can be attained by receiving information indicating it from the system controller 301 together with print data.

The current tag ID of interest is designated to read out data from the RFID tag (step S1503). The meaning of the tag ID of interest has been explained above using FIG. 14. It is checked based on the paper type information if the print medium of interest is a tab sheet (step S1504). If the print medium of interest is not a tab sheet, and if the cassettes to be checked still remains (step S1510), the next paper feed cassette is selected (step S1511), and the process is repeated from step S1503.

If the cassette of interest stores tab sheets, the following processes are executed.

Address 09h of the readout medium information records the tab position information of a tab sheet, i.e., the order of tab positions which are laid out from the upper portion to the lower portion of print media as 16-bit tab position information. During image formation, it can be done while reading out the aforementioned tab position information for each tab sheet. For this reason, even when jam has occurred due to some cause during image formation, the order of the jammed tab sheet, i.e., the tab position, can be detected. Upon recovering jam, the flapper 274 in FIG. 2 is switched to the path on the exhaust tray 276 side, thus exhausting sheets without image formation, until a tab sheet with an appropriate tab position is fed from the tab sheet paper feed unit. The exhausted tab sheets can be re-used. If a tab sheet with an appropriate tab position is fed, the flapper 274 is switched to the image forming path side to make image formation.

For this purpose, the tab position information included in the medium information is compared with the value of the tab order variable held in the memory 0012 (step S1505). If the two values match, since the tab position of the tab sheet of interest is a desired one according to the order of tab sheets to be inserted, the flapper 274 is switched to the image forming path side to convey and exhaust that tab sheet onto a designated exhaust tray (step S1508). Then, the tag ID of interest and tab order variable are incremented by 1, and the remaining quantity is decremented by 1 (step S1509).

On the other hand, if it is determined in step S1505 that the two values do not match, the flapper 274 is switched to the path on the exhaust tray 276 side to convey and exhaust that tab sheet onto the exhaust tray 276 (step S1506). Then, the tag ID of interest and tab order variable are incremented by 1, and the remaining quantity is decremented by 1 (step S1507). After that, the process is repeated from step S1505.

With this sequence, if it is designated to insert tab sheets, the insertion order of tab sheets can be appropriately managed, and tab sheets can be inserted in turn from the first one.

As described above, medium information of a print medium is read out from the RFID tag (wireless tag) attached to the print medium, and if it is determined based on the medium information that the print medium of interest is not suited to image formation, a warning is output, thus preventing image formation using a print medium other than a desired (i.e., designated) print medium.

If it is determined based on the readout medium information that the print medium of interest is a designated print medium, an optimal image forming condition to that print medium is set, and a high-quality image can be formed under the optimal condition to that print medium.

Since information associated with the quantity of print media can be displayed, and deficiency of the remaining quantity of print media can be output, image formation can be prevented from being interrupted due to out of print media.

When the total thickness of print media exceeds the thickness that can undergo, e.g., a staple process or the like, a warning message indicating it is output, thus allowing image formation suited to the condition of the post-process.

Furthermore, when the print medium is a tab sheet, it has tab position information of that tab sheet. Hence, even when the order of tab sheets has deviated due to jam or the like during the image forming operation, the order of tab sheets can be adjusted, and a tab sheet with an appropriate tab position can be inserted.

[Modification 1]

In this embodiment, information of a print medium is read out every time a print process is executed. Alternatively, information of each RFID tag read out by the medium information initialization process (FIG. 13) may be stored by forming a file which has the tag IDs as indices. In this case, all pieces of medium information included in each tag must be read out in addition to the tag ID. In place of step S1402 in FIG. 14, information is read out from the file using the tag ID of interest as an index, and the processes in step S1403 and subsequent steps are executed using the readout information as that of the paper sheet of interest. Furthermore, in step S1408 a record having that tag ID of interest as an index is deleted before the value of the tag ID of interest is updated. When tag information is saved as a file, the number of media can be managed as the number of records.

[Modification 2]

In the above embodiment, the electrophotographic image forming apparatus has been explained. In addition, the present invention can be applied to other image forming apparatuses such as an ink-jet printer, thermal printer, and the like. For example, in an ink-jet printer, dedicated paper sheets for photo print are commercially available, and the user conventionally switches setups of paper sheets to be used between such dedicated sheets and other plain sheets. By applying the present invention to such printer, the printer acquires medium information by reading the RFID tag attached to each print sheet, checks based on the paper type information included in the medium information if that paper sheet is a dedicated sheet or plain sheet, and can set the image forming condition in correspondence with the paper type.

Also, the paper type can include information such as "postcard" that can define the paper thickness, size, sheet material, and the like together. For example, when "postcard" is read from the RFID tag as a paper type, even when no information about the paper thickness, size, and material is set, the image forming condition may be set in correspondence with the thickness, size, and material of a postcard. The present invention is not limited to such specific "postcard", but can be applied to other media which have predetermined thicknesses, sizes, materials, and the like.

[Modification 3]

Upon reading out the IDs of print media, the IDs of all print media need not be read out. For example, if 500 or more IDs can be read out, it is determined that print media are stored. In this manner, when the maximum number of IDs to be read is set, no more IDs need be read out. Also, the IDs beyond the maximum number of IDs that can be read by the RFID tag reader circuit are not counted.

Second Embodiment

Figure 16:
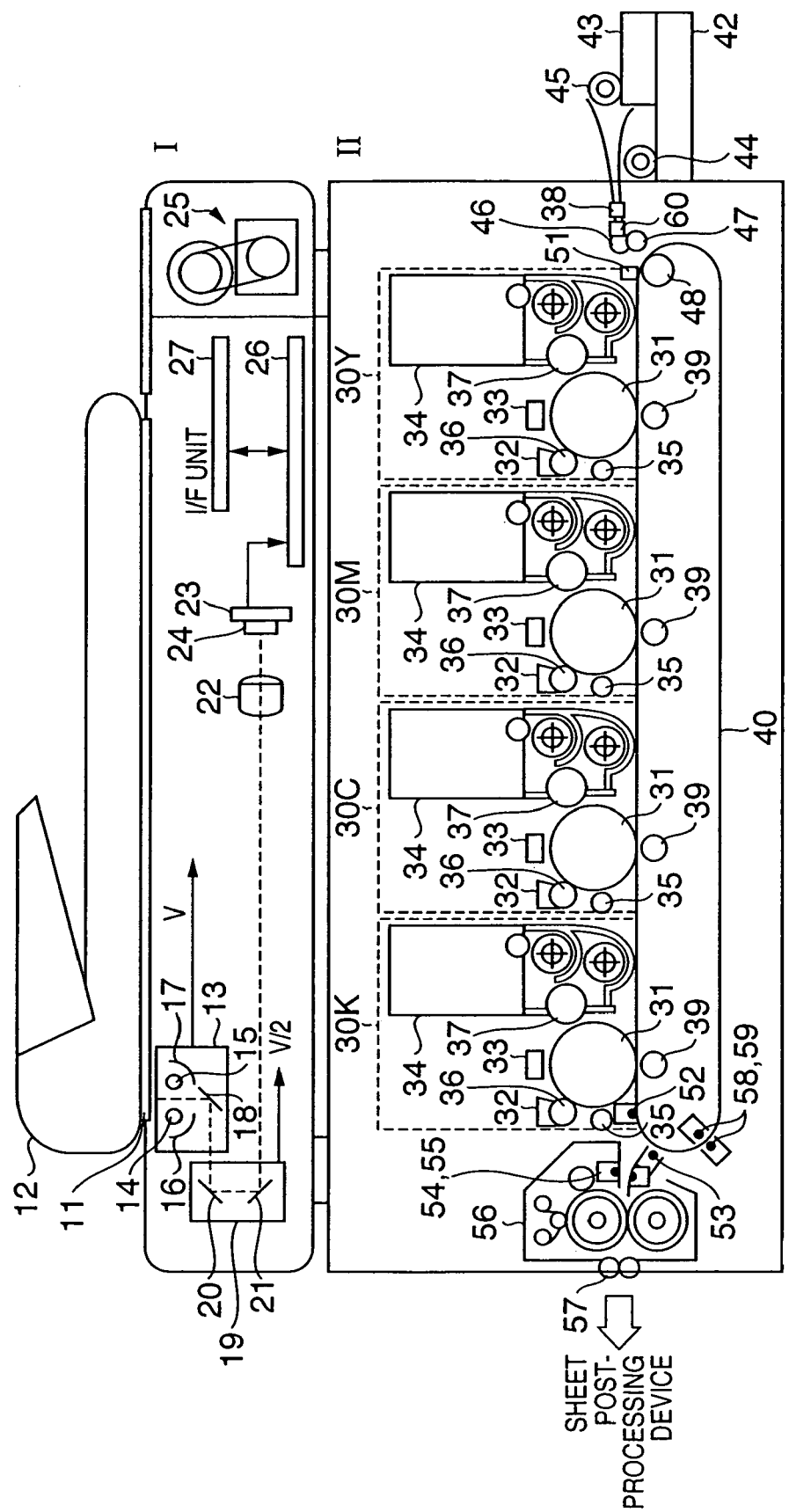
FIG. 16 is a sectional view of an image forming apparatus according to the second embodiment.

An image forming apparatus according to the second embodiment of the present invention will be described below. FIG. 16 is a sectional view showing an embodiment of an image forming apparatus of the present invention. This color image forming apparatus has a color reader unit I in an upper portion, and a color printer unit II in a lower portion.

Referring to FIG. 16, a document table glass (platen) (11) extends on the upper portion of the color reader unit, and a document feeder (DF) (12) is set on the platen. The document feeder (12) has a document sensor which detects if a document is set, and a document detection signal is supplied to a control CPU. Note that an arrangement which comprises a mirror-surface pressing plate (not shown) in place of the document feeder (12) is available. In the color reader unit (I), first and second carriages (13, 19) are arranged. In the first carriage (13), light sources (14, 15) which comprise halogen lamps, reflection umbrellas (16, 17) for focusing light beams coming from these light sources (14, 15) onto a document, and a mirror (18) for reflecting light reflected by or projected through a document are mounted. In the second carriage (19), mirrors (20, 21) for focusing light reflected by the mirror (18) onto a CCD (24) is mounted.

Note that the first and second carriages (13, 19) are respectively mechanically moved by drive means (25) at velocities V and V/2 in a direction perpendicular to an electrical scan (main scan) direction, thus scanning (sub-scanning) the entire surface of a document. The color reader unit I further comprises a board (23) on which the CCD (24) is mounted, an image processing unit (26), and an interface (I/F) (27) with another IPU or the like.

In FIG. 16, each of a Y image forming unit (30Y), M image forming unit (30M), C image forming unit (30C), and K image forming unit (30K) comprises a photosensitive drum (31), charger (32), LED unit or array (33), developer (34), and auxiliary charger (35). Each charger (32) comprises a sleeve (36), and each developer (34) comprises a developing sleeve (37).

Note that the Y image forming unit (30Y) will be described in detail below since these image forming unit have the same arrangement, and a description of other image forming units will be omitted.

The Y image forming unit (30Y) comprises the photosensitive drum (35), and the charger (32), LED unit (33), developer (34), auxiliary charger (35), and the like are laid out around the photosensitive drum.

The operation of these components will be described below. The photosensitive drum is charged by the auxiliary charger (35) and charger (32). The charger (32) rotates the sleeve (36) in a direction opposite to that of the photosensitive drum (FIG. 16) to uniformly charge the surface of the photosensitive drum (31) using a dielectric brush which is formed of a low-resistance ferrite carrier, thus preparing for latent image formation.

Next, by irradiating the photosensitive drum (31) with light coming from the LED array (33), an electrostatic latent image is formed on the surface of the photosensitive drum (31), and is developed by the developer (34) using a yellow developer, thus visualizing the latent image as a yellow toner image. The developer (34) comprises the developing sleeve (37), which carries a developing agent, conveys it to the photosensitive drum (31), and develops the latent image while a developing bias is applied to the developing sleeve (37).

Below the photosensitive drum (31), a transfer charger (transfer roller) (39) is arranged to sandwich a transfer belt (40) of a print agent convey member between them. The transfer charger (39) discharges from the back side of the transfer belt (40), thus transferring the yellow toner image on the photosensitive drum (31) onto a print medium P such as a paper sheet or the like, which is carried and conveyed on the transfer belt (40).

After the transfer, the residual toner on the photosensitive drum (31) is temporarily collected by the charger (32), and its charge polarity is changed by triboelectricity with a carrier. After that, the toner is returned onto the photosensitive drum (31) again, and the developer (34) recovers and re-uses it.

A sequence for forming an image on a print sheet or the like will be described below. Print sheets or the like, which are stored in cassettes (42, 43) are picked up one by one by pickup rollers (44, 45) and the picked-up print sheet is detected by a registration ON sensor (38). The state of the registration ON sensor is controlled by the CPU, which makes control to temporarily stop the paper sheet in this case. A wireless reader (60) reads out information of the stopped sheet. The temperature of a fixing device (56) and the speed of a driving roller (48) are controlled on the basis of the read result of the wireless reader (60). The sheet that has undergone wireless reading is fed onto the transfer belt (40) which is moved by registration rollers (46, 47).

The transfer belt (40) is an endless moving member, which is laid out below the Y image forming unit (30Y), M image forming unit (30M), C image forming unit (30C), and K image forming unit (30K), is looped on a plurality of rollers such as the driving roller (48) and the like, and pivots in the direction of the arrow in FIG. 16 upon driving of the driving roller (48).

The leading end of the print sheet fed onto the transfer belt (40) is detected by a paper leading end sensor (51). The detection signal of this paper leading end sensor is supplied from the printer unit to the color reader unit, and is used as a sub-scan sync signal upon sending a video signal from the color reader unit to the printer unit.

After that, the print sheet or the like is conveyed by the transfer belt (40), and toner images are formed on this sheet by the image forming units (30Y, 30M, 30C, 30K) in the order of YMCK.

The print sheet or the like that has left the K image forming unit (30K) is discharged by a discharger (52) so as to facilitate separation from the transfer belt (40), and is then separated from the transfer belt (40). A peeling charger (53) is arranged adjacent to the discharger (52), and prevents image disturbance due to peeling discharge upon separating the print sheet or the like from the transfer belt (40).

The separated print sheet or the like is charged by pre-fixing chargers (54, 55) so as to compensate for the attraction force of toner and to prevent image disturbance, and the toner images are thermally fixed by a fixing device (56). The print sheet is exhausted onto an exhaust tray (57). The transfer belt (40) is discharged by an inside/outside discharger (59).

The image forming apparatus shown in FIG. 16 comprises the same arrangement as that of the image forming apparatus of the first embodiment shown in FIG. 1 and FIGS. 3 to 5.

FIG. 17 shows the arrangement of a control panel of a console 302 provided to the reader unit 2001. A display unit (701) displays the operation states and messages. The surface of the display unit (701) comprises a touch panel, which servers as selection keys when the user touches it. A ten-key pad (702) includes keys used to input the number of copies. An operation starts when the user has pressed a start key (703). When the user has pressed an application mode key (704), a sheet material selection window (750) opens. By pressing one of paper selection keys (751), a desired sheet medium can be selected.

A wireless ON key (753) and wireless OFF key (752) are used to turn on/off a wireless read mode. With these keys, one of first control means which controls an image forming condition on the basis of information read from recording media included in a sheet medium, and second control means which disables the first control means, and controls an image forming condition on the basis of sheet medium information set by the user can be selected.

By selecting the wireless ON key (753), the first control means is selected. By selecting the wireless OFF key (752), the second control means is selected. The second control means makes control based on information of user's choice using the paper selection keys (751).

The wireless ON and OFF keys (753, 752) are exclusively set, and one control clears the other control.

In a default setup state, the wireless read mode (wireless ON key (753)=ON) is ON, and the first control means is enabled. In this case, the second control means based on information of user's choice using the paper selection keys (751) is complementary means to the first control means, and is applied when the first control means fails to read out sheet medium information or the read result is inappropriate.

FIGS. 18A and 18B show the arrangement of sheet media which include storage media in this embodiment. Referring to FIG. 18A, a sheet medium (1100) includes one recording medium (1101). A sheet medium (1110) includes a plurality of recording media (1111 to 1115). When the sheet medium includes a plurality of recording media, as shown in FIG. 18B, all the recording media (1111 to 1115) include identical sheet medium information. Even when the sheet medium include one recording medium (1101), the position where the recording medium is to be included is not particularly specified. Since the position is not specified, the sheet medium can easily include the recording medium. Note that even a case wherein a recording medium is attached to a sheet medium, which does not correspond to a case of "include" as terms, is included in "include" in this specification. That is, in this specification, a sheet medium includes a recording medium as long as the sheet medium and recording medium are combined without losing unity upon normal handling.

Figure 19:
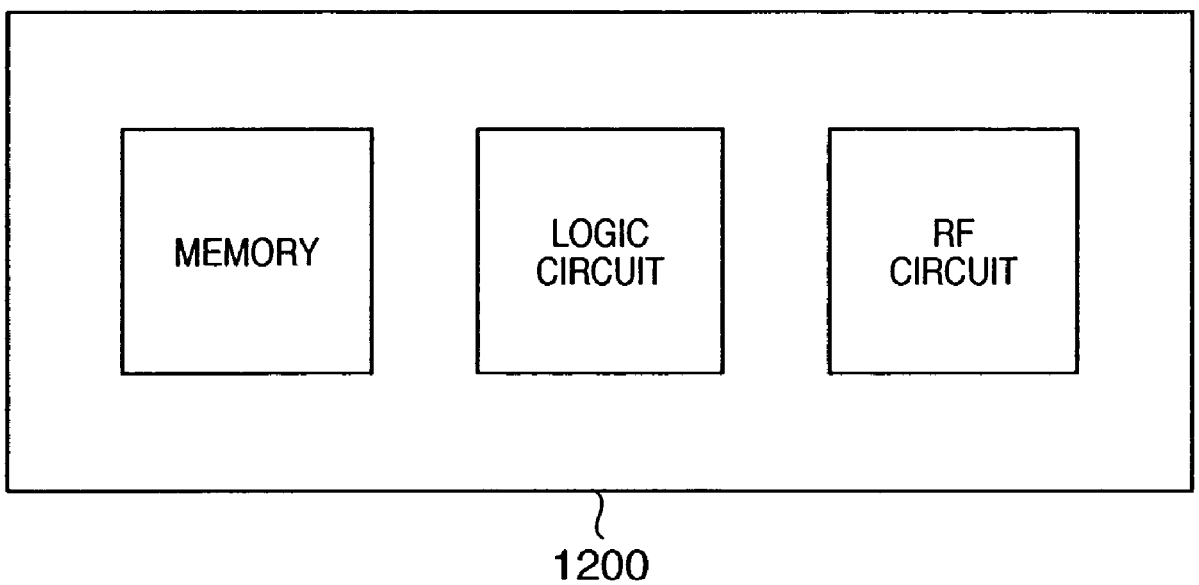
FIG. 19 is a diagram of a wireless chip included in the sheet medium according to the second embodiment.

FIG. 19 is a diagram for explaining the recording medium (1101, 1111 to 1115) of this embodiment included in the aforementioned sheet medium (1101, 1110). The recording medium comprises a wireless chip (1200) which allows a non-contact read process, and is called, e.g., an RFID tag. The wireless chip (1200) has a communication range up to a distance of about 30 cm. The position of the wireless chip on the sheet medium is not particularly specified. The size of the wireless chip (1200) is about 0.5 mm×0.5 mm×0.05 mm. A power supply is not particularly required in the chip since it is supplied by electromagnetic induction of an RF circuit upon radio reception. The chip is disabled in a state other than radio reception. A memory is a nonvolatile memory, and is set in advance with information upon shipping a sheet medium.

FIG. 20 is a table for explaining information to be held in the memory in the wireless chip (1200). The information to be held includes, e.g., physical information of a sheet medium itself (e.g., material information (1201), paper size (1202), and the like, and a control condition (e.g., fixing temperature (1203) optimal to the sheet medium upon image formation.

Figure 21:
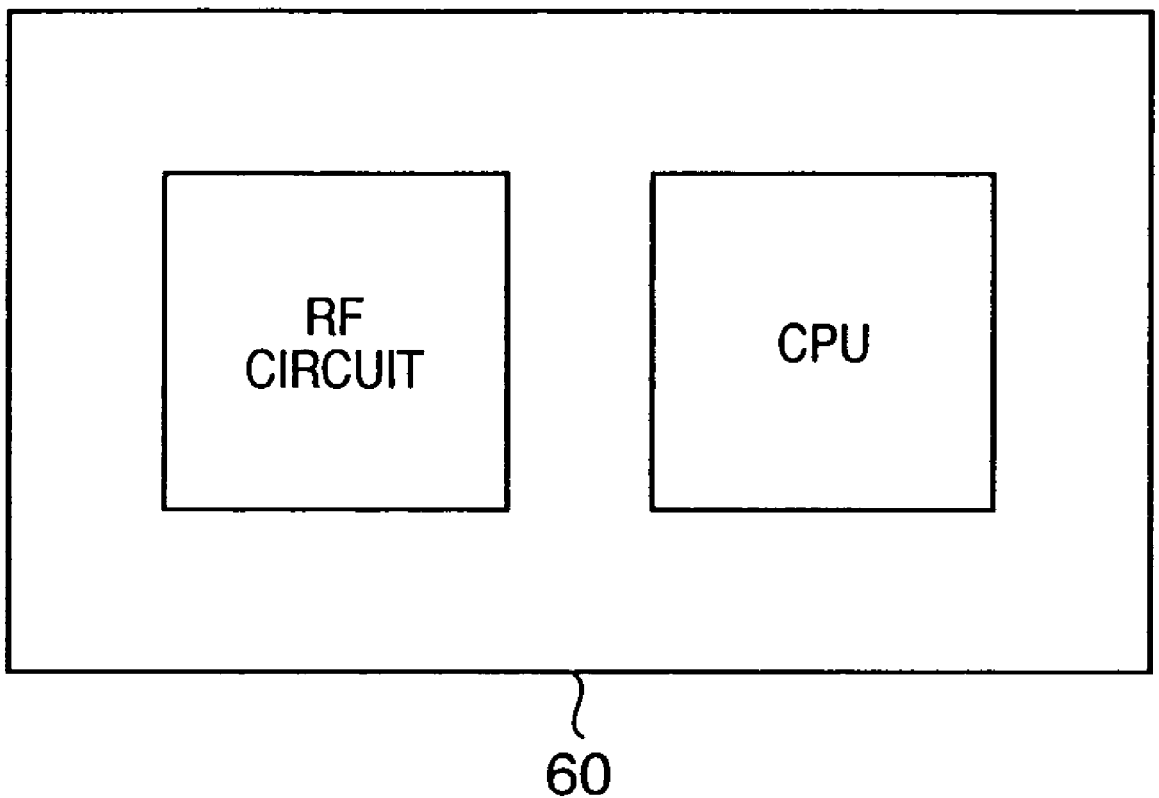
FIG. 21 is a diagram of a wireless reader of the image forming apparatus according to the second embodiment.
Figure 22:
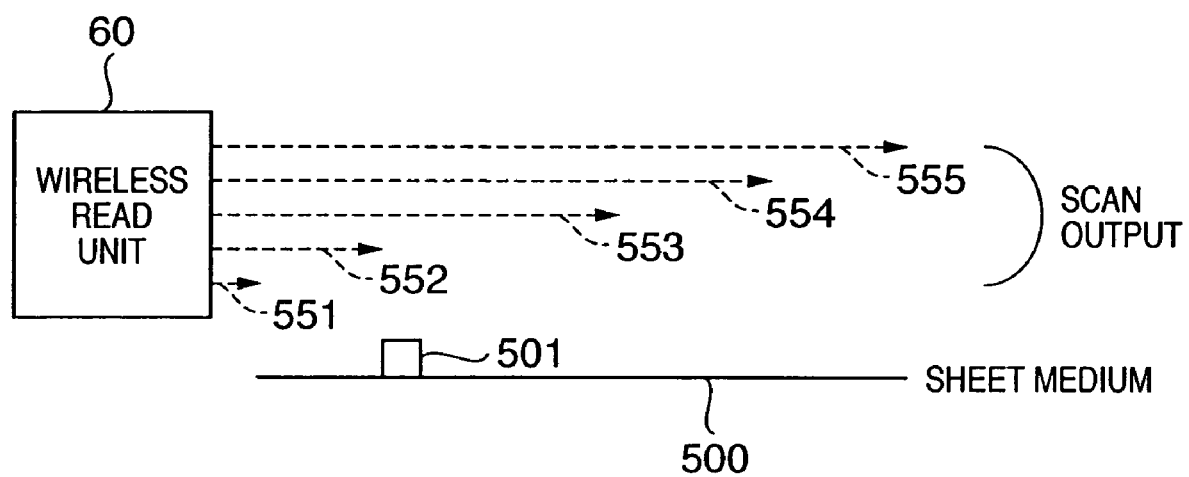
FIG. 22 is a view showing scan outputs of a wireless unit according to the second embodiment.

FIG. 21 shows a wireless reader (wireless unit 60 of the image forming apparatus of this embodiment. The wireless unit 60 is a chip set which mounts an RF circuit, but may be implemented by a combination of a CPU as a controller and an RF circuit which are arranged independently. FIG. 22 is a view for explaining the information read operation of this wireless unit from the sheet medium (1100, 1110).

The wireless unit gradually increases a scan output with respect to a sheet medium, on which the position of a recording medium is not specified (1551 to 1555). In case of a sheet medium including a plurality of wireless chips, control is made to read out information from only the first wireless chip (e.g., 1111) with which a communication is established, and not to read out information from other wireless chips (1112 to 1115).

By gradually increasing the scan output, there are two advantages: information can be read out from the recording medium of the sheet medium on which the position of the recording medium is not specified (first advantage), and information can be prevented from being read out from sheet media in the paper deck in FIG. 16, and information can be read out from only a sheet medium fed by the pickup roller (44, 45) (second advantage) in FIG. 16.

The upper limit of the scan output corresponds to a distance for one sheet medium to be fed. FIG. 23 shows an example of the scan output upper limits for respective paper sizes. By specifying the upper limit, the second advantage, i.e., reading out information from only a sheet medium to be fed, is attained, and a control means change process from the first control means that applies sheet material read information to the second control means that applies the user setup condition begins when information cannot be read out.

Figure 24:
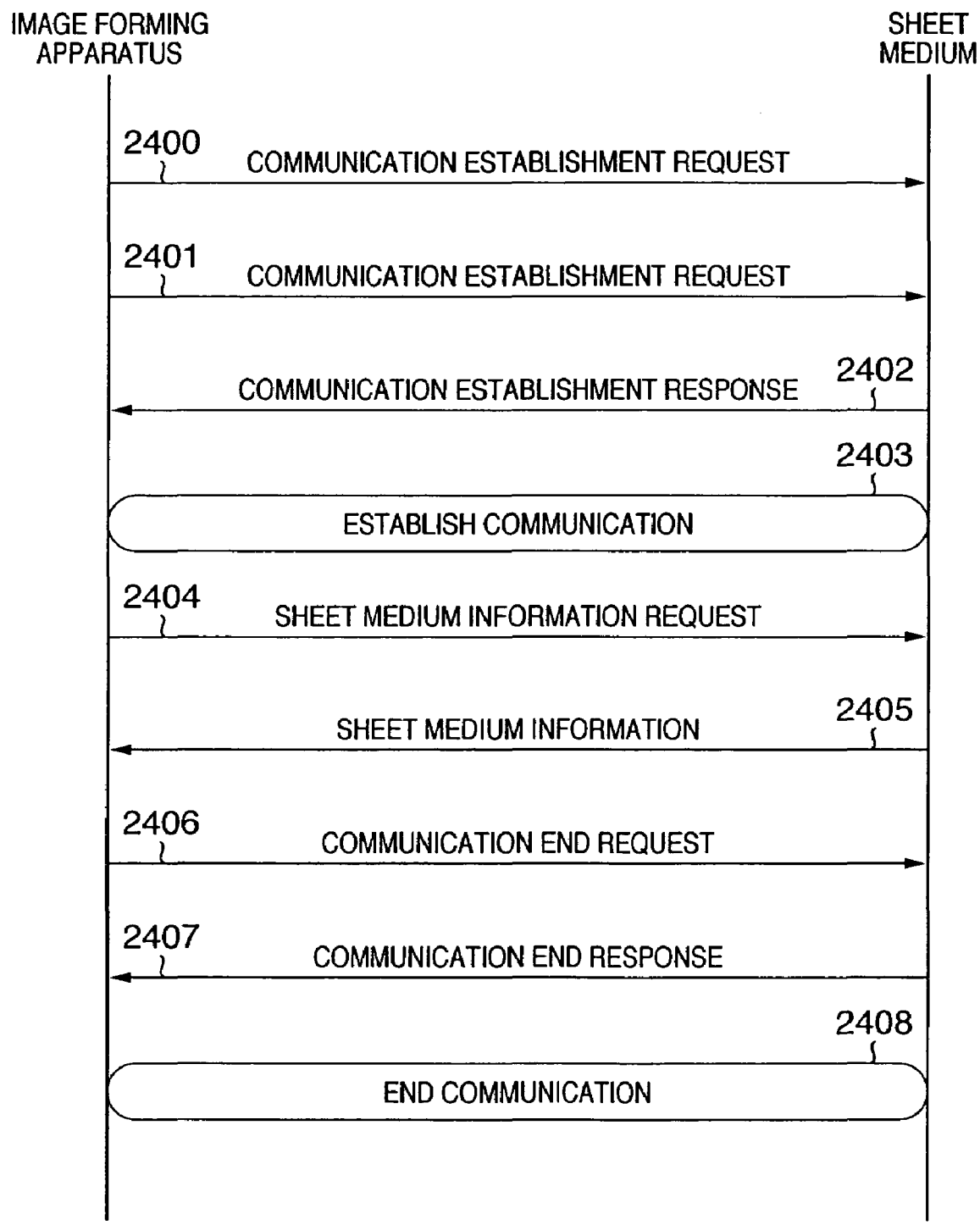
FIG. 24 is a schematic chart showing a communication sequence between the image forming apparatus and wireless chip according to the second embodiment.

FIG. 24 shows a communication sequence between the wireless chip (1200) on the sheet medium side, and the wireless reader (60) on the image forming apparatus side. The wireless reader (60) begins to transmit a communication establishment request (2400) in response to detection of a sheet medium by the registration ON sensor (38) in FIG. 16 as a trigger. If no response is returned, the wireless reader (60) repetitively transmits another communication establishment request (2401) while gradually increasing the scan output, as shown in FIG. 22. The wireless chip of the sheet medium returns a communication establishment response (2402) in response to the communication establishment request (2400, 2401). In this way, a communication state (2403) is established. The image forming apparatus transmits a sheet medium information request (2404). The sheet medium transmits sheet medium information (2405) in response to this request. The image forming apparatus side transmits a communication end request (2406), and the sheet medium transmits a communication end response (2407), thus closing the communication (2408). A time required until completion of a series of read processes is, e.g., 0.5 sec or less, which do not particularly influence a print process in large quantities.

Figure 25:
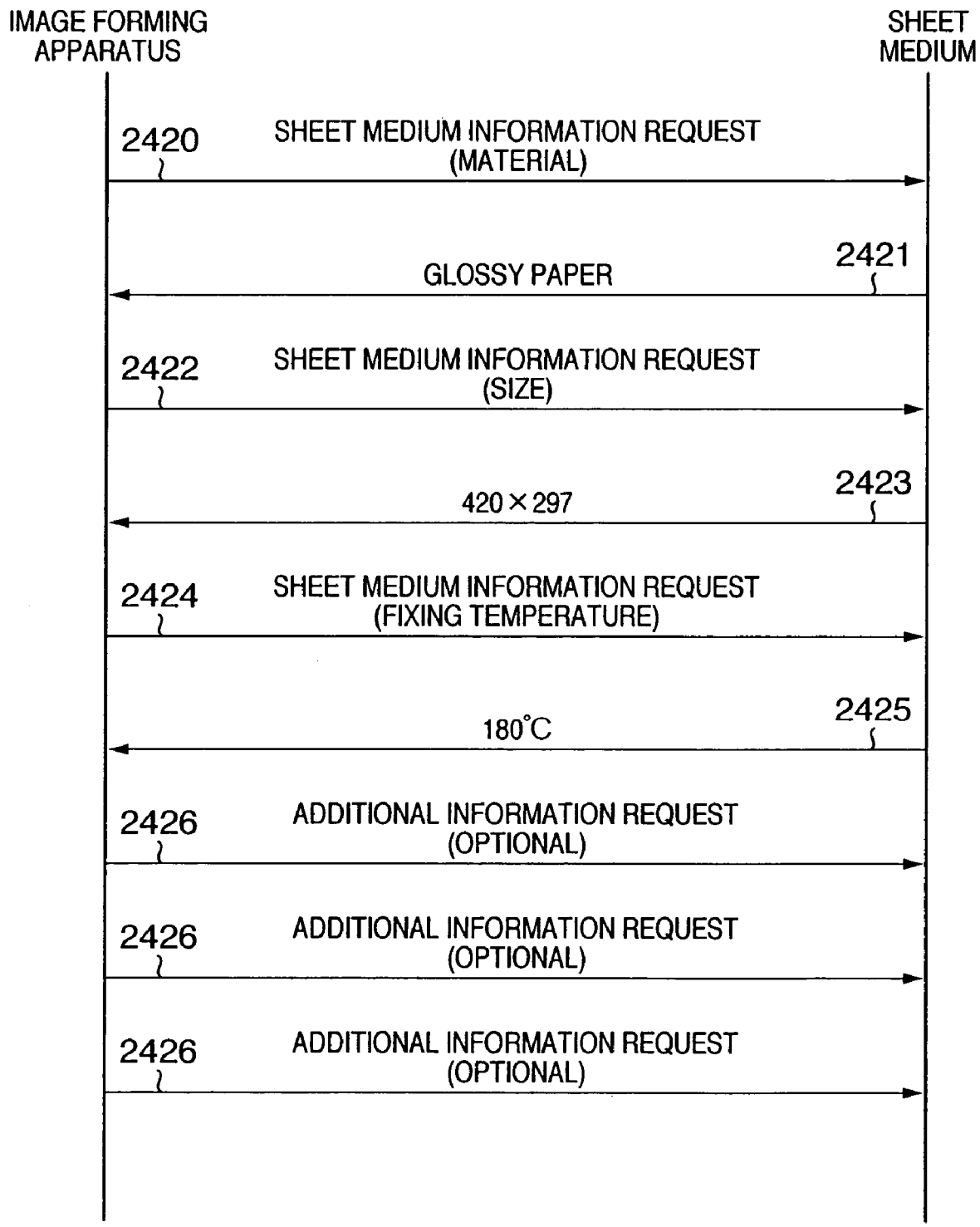
FIG. 25 is a detailed chart showing a communication sequence between the image forming apparatus and wireless chip according to the second embodiment.

FIG. 25 shows further details of the contents of the sheet medium information request (2404) and sheet medium information (2405) as its response in FIG. 24. A sheet medium information request (2404) includes a plurality of read requests of information such as a material (2420), size (2422), fixing temperature (2424), and the like. The sheet medium side returns responses (2421, 2423, 2425) in response to these requests. Newly required information on the image forming apparatus side may be optional information, which is not held on the memory on the sheet medium side. In such case, for example, the image forming apparatus side outputs a sheet medium information request (2426) a plurality of times. If no response is returned from the sheet medium, the image forming apparatus determines that the information is not held in the recording medium of the sheet medium side. In this manner, a communication between the image forming apparatus and sheet medium can reserve expandability in the future. The image forming apparatus stores such optional information which cannot be read out as default values. For example, FIG. 26 is a table showing the default values of fixing temperatures and convey speeds for respective sheet media. In addition to these values, high-voltage conditions for transfer, charging, and the like may be held as default values. When the image forming apparatus has such table as a default, even when basic information, e.g., sheet material information alone, is read out, the first control that changes the control condition on the basis of information read out from the recording medium can be continued.

Figure 27:
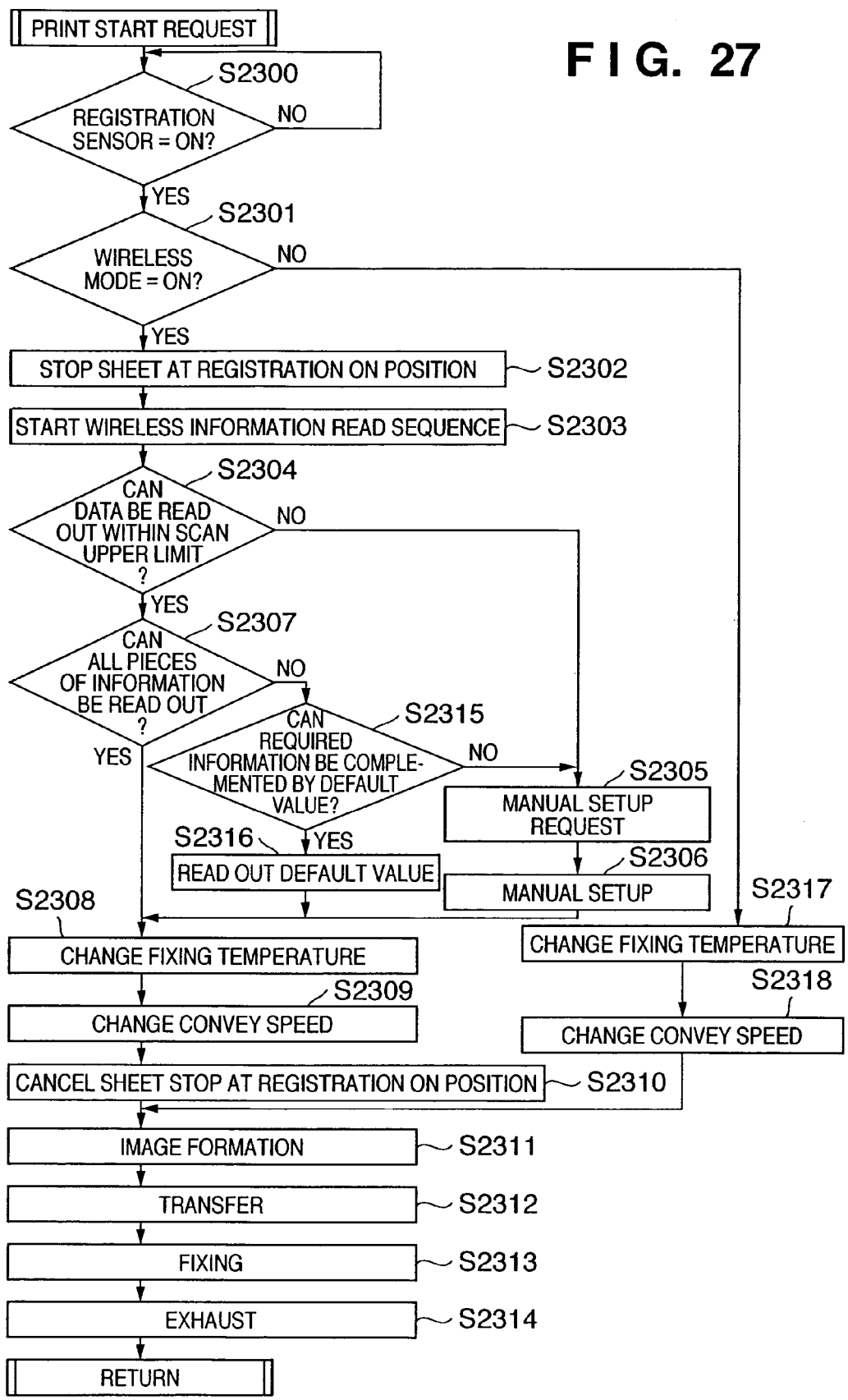
FIG. 27 is a flowchart showing the process according to the second embodiment.

FIG. 27 is a flowchart showing the sheet medium information read process. The flowchart in FIG. 27 is controlled by a controller (not shown) such as a CPU or the like. The registration ON sensor detects in response to a print start request whether or not a sheet medium is fed from the pickup roller (2300). If the leading end of the sheet medium is detected, it is checked if the wireless read mode is set to be ON (2301).

If the wireless read mode is ON, the sheet medium is stopped at the position of the registration ON sensor before it is fed to the transfer belt (2302). At this position, a wireless information read process starts (2303). It is checked if information can be read out within the scan upper limit (2304). If information cannot be read out, the sheet medium selection window (750) on the control panel in FIG. 17 opens automatically to issue a manual setup request (2305) and to prompt the user to make manual setups (2306). If wireless information can be read out, it is checked if all pieces of requested information can be read out (2307). If all or some pieces of requested information cannot be read out, it is checked if those pieces of information can be complemented by default values of the image forming apparatus (2315). If the information can be complemented, default values are read out (2316).

If the information cannot be complemented, a manual setup request (2305) (e.g., a beep tone or the like) is issued in the same manner as in a case wherein wireless information cannot be read out, thus prompting the user to make manual setups (2306). In either case, a fixing temperature change process (2308) and convey speed change process (2309) are executed in accordance with the information. After these change processes, conveyance of the sheet medium, which is stopped at the position of the registration ON sensor, restarts (2310). An image forming process (2311), transfer process (2312), and fixing process (2313) are executed, and the flow ends when the sheet medium is exhausted (2314). The reason why the sheet medium is stopped at the position of the registration ON sensor (2302) is that the convey speed cannot be switched (2309) once the sheet medium is fed. For this reason, a sheet medium stop cancel process (2302) is executed after the convey speed is switched (2309).

If the wireless read mode is OFF, since sheet medium information is set in advance by the user, the fixing temperature is changed to a pre-set value (2317), the convey speed is changed to a pre-set value (2318), and the flow jumps to the image forming process (2311) without stopping the sheet medium.

In the aforementioned sequence, the process in which the flow jumps from step S2301 to the image formation process in step S2308 and subsequent steps via steps S2315 and S2316, and the process in which the flow advances to step S2308 via steps S2305 and S2306 correspond to the first control means which is controlled according to the user setups. Also, the process in which the flow advances from step S2301 to steps S2317 and S2318, and the process in which the flow advances to step S2311 and subsequent steps correspond to the second control means. In either case, the control sequence executed when the wireless read mode is OFF seems to be completed rapidly in terms of process. However, since this control sequence requires manual setups of sheet information in advance, the manual setup times are accumulated compared to the flow executed when the wireless read mode is ON with increasing number of times of image formation. For this reason, when various sheet media are used together, the process executed when the wireless read mode is ON can be done at higher speed.

With the invention according to this embodiment, when a bundle of sheets which include a plurality of types of print media are to be printed, information is read out from each individual print medium, and an optimal control condition can be automatically set without any manual setup input of the image forming apparatus. As a result, the print time required for a plurality of types of print media can be shortened. Some user's manual steps require user's knowledge about print media. If the user makes wrong setups, a print result cannot be obtained under an appropriate control condition. Since the control condition can be automatically set, user's manual setups can be eliminated as much as possible, thus reducing the load on the user.

Third Embodiment

Figure 28:
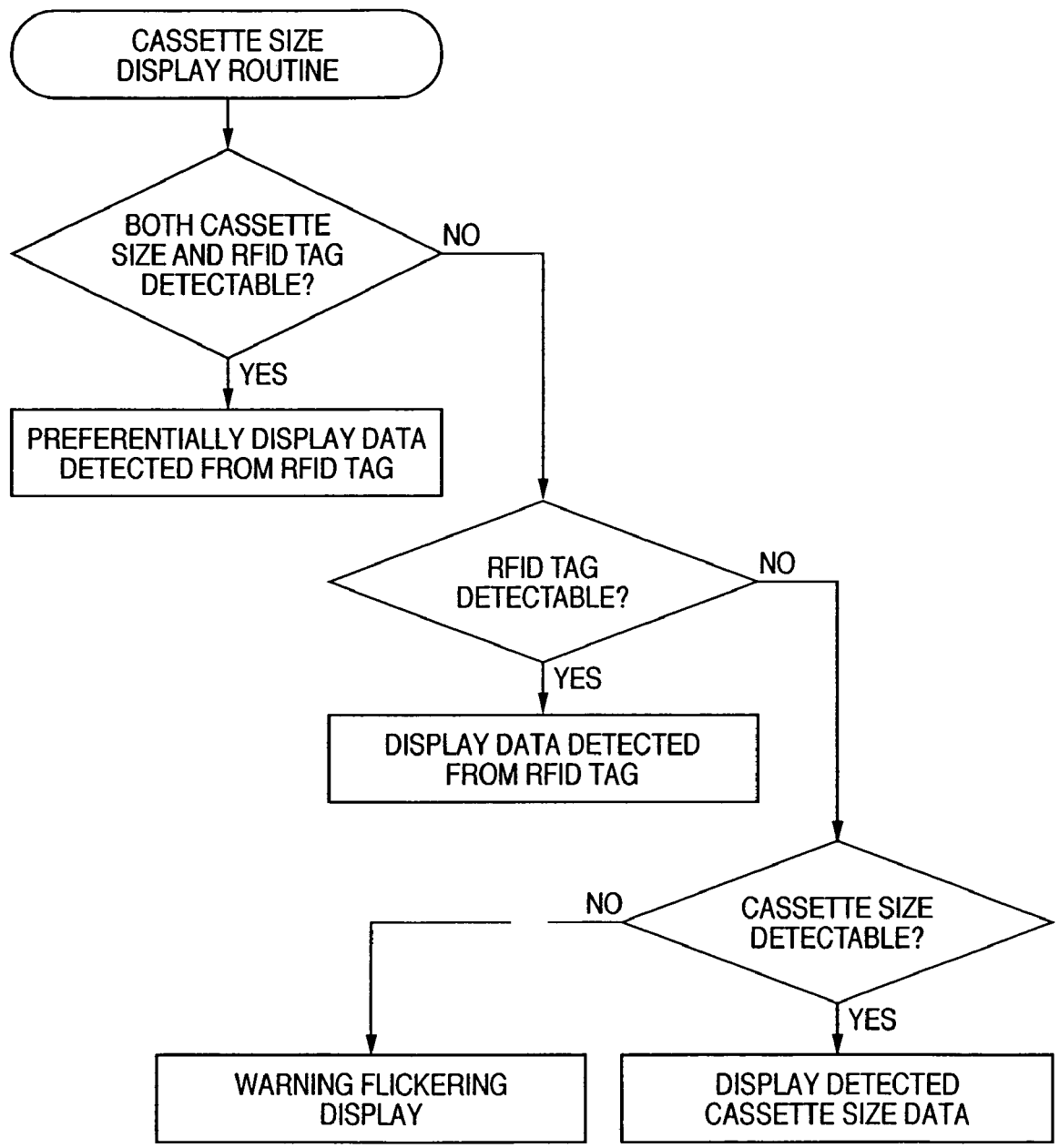
FIG. 28 is a flowchart associated with a display process of a paper size read from an RFID tag or an indicator of a paper cassette in the third embodiment.

This embodiment relates to a control method which can be practiced by either the image forming apparatus of the first or second embodiment. FIG. 28 is a flowchart associated with a display process of a paper size read from the RFID tag or the indicator of the paper cassette. The flowchart of FIG. 28 is controlled by a controller (not shown) such as a CPU or the like. In this embodiment, information read from the RFID tag of a sheet medium is displayed on the console as needed. That is, information is to be read out from the RFID tags attached to sheet media in each paper cassette in the first embodiment or the RFID tag which is picked up from each paper cassette and is conveyed on the convey path in the second embodiment. The readout information is temporarily stored in the memory 0012 or the like. Of the read information, information which is to be usefully presented to the user (e.g., the paper size, paper type (plain paper/OHP sheet or the like)) is displayed by a display process. This process is executed when the cassette is loaded into the image forming apparatus main body or when the uppermost sheet medium is picked up from the cassette.

For example, in case of a paper size, the paper cassette often has an indicator that indicates the size of paper sheets stored in the cassette. In such case, the image forming apparatus main body can detect the paper size based on that indicator. Hence, two different values, i.e., the paper size read from the RFID tag, and the size detected from the paper cassette are read for one sheet medium. In this case, the size read from the RFID tag is preferentially displayed. Of course, when the size is read from only the RFID tag, that size is displayed. When the size is read from only the paper cassette, that size is displayed.

This is an example of the paper size. When information read out from the RFID tag attached to a sheet medium has the same meaning as that detected by another sensor mounted on a paper conveying route or the like, the information read out from the RFID tag is preferentially used. For example, information read out from the RFID tag is preferentially used for the purpose of display, setup of an image forming mode, and the like. In this way, information held in each sheet medium can be used prior to uniformly input information, and more flexible image formation control can be implemented.

By selecting the wireless ON key described in the second embodiment, the control may be made to read the RFID tag or the control may be made to read both the RFID tag and the indicator of the cassette by way of compensation of a case wherein the RFID tag cannot be read, information of the RFID tag may be read preferentially, and information read from the indicator of the cassette may be used when the RFID tag cannot be read. On the other hand, by selecting the wireless OFF key described in the second embodiment, the control may be made to inhibit the RFID tag read process, and to read only the indicator of the cassette.

Furthermore, the user cannot determine information which is read from the RFID tag or the indicator of the cassette. Hence, the read information may be displayed together with a message indicating the information which is read from the RFID tag or the indicator of the cassette.

In order to confirm only information of the RFID tag, e.g., information shown in FIG. 9B, FIG. 20, FIG. 26, or the like for each selected cassette, information may be displayed on the console or printed on a sheet by selecting a specific mode. The specific mode may be a service mode, a user mode or the like.

As many apparently widely different embodiments of the present invention can be made without departing from the spirit and scope thereof, it is to be understood that the invention is not limited to the specific embodiments thereof except as defined in the appended claims.

What is claimed is:

1. An image forming apparatus for forming an image on a sheet medium, comprising:
    first read means for reading information from an information holding medium which is attached to the sheet medium and can make two-way communications;
    second read means for reading an indicator provided for a sheet storage member or information from a sensor provided on a paper conveying route; and
    control means for, when information can be read from both said first read means and said second read means, the information read by the first read means is preferentially used to control image formation.

2. An image forming apparatus for forming an image on a sheet medium, comprising:
    first read means for reading information from an information holding medium which is attached to the sheet medium and can make two-way communications;
    second read means for reading an indicator provided for a sheet storage member or information from a sensor provided on a paper conveying route;
    control means for, when information can be read from both said first read means and said second read means, the information read by the first read means is preferentially used; and
    display means for displaying an output from said control means.

3. The apparatus according to claim 2, wherein said display means displays at least information associated with a size or paper type of the sheet medium.

4. The apparatus according to claim 2, wherein said display means discriminates between the output read by said first read means and the output read by said second read means.

* * * * *